(12) United States Patent
Sakurai

(10) Patent No.: US 8,194,980 B2
(45) Date of Patent: Jun. 5, 2012

(54) COLOR GAMUT OUTLINE COMPUTING DEVICE, METHOD, AND PROGRAM STORAGE MEDIUM

(75) Inventor: Takuya Sakurai, Kanagawa (JP)

(73) Assignee: Fuji Xerox Co., Ltd., Toyko (JP)

( * ) Notice: Subject to any disclaimer, the term of this patent is extended or adjusted under 35 U.S.C. 154(b) by 683 days.

(21) Appl. No.: 12/431,320

(22) Filed: Apr. 28, 2009

(65) Prior Publication Data

US 2010/0092081 A1    Apr. 15, 2010

(30) Foreign Application Priority Data

Oct. 9, 2008   (JP) ................................ 2008-262751

(51) Int. Cl.
*G06K 9/00* (2006.01)

(52) U.S. Cl. ......... 382/167; 362/199; 358/1.9; 358/518; 358/539

(58) Field of Classification Search .................. 382/162, 382/167, 199; 358/1.9, 518, 539
See application file for complete search history.

(56) References Cited

U.S. PATENT DOCUMENTS

| | | | | |
|---|---|---|---|---|
| 5,553,199 | A * | 9/1996 | Spaulding et al. | 358/1.9 |
| 6,057,932 | A * | 5/2000 | Yoshida et al. | 358/1.9 |
| 6,100,999 | A | 8/2000 | Ikegami | |
| 6,275,607 | B1 * | 8/2001 | Shimizu et al. | 382/167 |
| 6,313,925 | B1 * | 11/2001 | Decker et al. | 358/1.9 |
| 7,050,197 | B1 * | 5/2006 | Szumla et al. | 358/1.9 |
| 7,116,441 | B1 * | 10/2006 | Matsuoka | 358/1.9 |
| 7,436,543 | B2 | 10/2008 | Yamamoto et al. | |
| 7,574,041 | B2 * | 8/2009 | Andresen et al. | 382/167 |
| 2005/0062992 | A1 | 3/2005 | Kishimoto et al. | |
| 2007/0279658 | A1 * | 12/2007 | Ito et al. | 358/1.9 |

FOREIGN PATENT DOCUMENTS

| | | |
|---|---|---|
| JP | A-10-262157 | 9/1998 |
| JP | A-2003-8912 | 1/2003 |
| JP | A-2004-338098 | 12/2004 |
| JP | A-2005-63093 | 3/2005 |
| JP | A-2006-140661 | 6/2006 |
| JP | A-2006-352475 | 12/2006 |
| JP | A-2008-193496 | 8/2008 |

OTHER PUBLICATIONS

Office Action issued in Japanese Patent Application No. 2008-262751, dated Oct. 12, 2010 (with English translation).

* cited by examiner

*Primary Examiner* — Matthew Bella
*Assistant Examiner* — Eueng-Nan Yeh
(74) *Attorney, Agent, or Firm* — Oliff & Berridge, PLC

(57) ABSTRACT

A device includes a setting section that sets a single-color amount limit and an ink total amount limit, an upper half outline constructing section, a lower half outline constructing section, a restricting outline constructing section, and a color space converter. The upper half outline points are points at which one or more color components are 0% and that satisfy the single-color amount limit and the ink total amount limit. The lower half outline points are points at which one or more color components satisfy the single-color amount limit and that satisfy the ink total amount limit. The restricting outline points satisfy the single-color amount limit and the ink total amount limit, and are connected to the upper or lower half outline points which satisfy the single-color amount limit and the ink total amount limit. The color space converter converts the constructed outline points into another color space.

18 Claims, 26 Drawing Sheets

(COLOR MATERIAL TOTAL AMOUNT LIMIT: 250%)

(COLOR MATERIAL TOTAL AMOUNT LIMIT: 250%)

(COLOR MATERIAL TOTAL AMOUNT LIMIT: 150%)

(COLOR MATERIAL TOTAL AMOUNT LIMIT: 150%)

(COLOR MATERIAL TOTAL AMOUNT LIMIT: 250%)

(COLOR MATERIAL TOTAL AMOUNT LIMIT: 250%)

(COLOR MATERIAL TOTAL AMOUNT LIMIT: 150%)

(COLOR MATERIAL TOTAL AMOUNT LIMIT: 150%)

(COLOR MATERIAL TOTAL AMOUNT LIMIT: 250%)

(COLOR MATERIAL TOTAL AMOUNT LIMIT: 250%)

(COLOR MATERIAL TOTAL AMOUNT LIMIT: 150%)

(COLOR MATERIAL TOTAL AMOUNT LIMIT: 150%)

(COLOR MATERIAL TOTAL AMOUNT LIMIT: 250%)

(COLOR MATERIAL TOTAL AMOUNT LIMIT: 250%)

(COLOR MATERIAL TOTAL AMOUNT LIMIT: 150%)

(COLOR MATERIAL TOTAL AMOUNT LIMIT: 150%)

(COLOR MATERIAL TOTAL AMOUNT LIMIT: 250%)

|  | CYAN (C) | MAGENTA (M) | YELLOW (Y) | BLACK (K) |
|---|---|---|---|---|
| W | 0% | 0% | 0% | 0% |
| C100 | 100% | 0% | 0% | 0% |
| M100 | 0% | 100% | 0% | 0% |
| Y100 | 0% | 0% | 100% | 0% |
| B100 | 100% | 100% | 0% | 0% |
| R100 | 0% | 100% | 100% | 0% |
| G100 | 100% | 0% | 100% | 0% |

(COLOR MATERIAL TOTAL AMOUNT LIMIT: 150%)

|      | CYAN (C) | MAGENTA (M) | YELLOW (Y) | BLACK (K) |
|------|----------|-------------|------------|-----------|
| W    | 0%       | 0%          | 0%         | 0%        |
| C100 | 100%     | 0%          | 0%         | 0%        |
| M100 | 0%       | 100%        | 0%         | 0%        |
| Y100 | 0%       | 0%          | 100%       | 0%        |
| B1   | 100%     | 50%         | 0%         | 0%        |
| B2   | 50%      | 100%        | 0%         | 0%        |
| R1   | 0%       | 100%        | 50%        | 0%        |
| R2   | 0%       | 50%         | 100%       | 0%        |
| G1   | 50%      | 0%          | 100%       | 0%        |
| G2   | 100%     | 0%          | 50%        | 0%        |

(COLOR MATERIAL TOTAL AMOUNT LIMIT: 250%)

|  | CYAN (C) | MAGENTA (M) | YELLOW (Y) | BLACK (K) |
|---|---|---|---|---|
| CK100 | 100% | 0% | 0% | 100% |
| MK100 | 0% | 100% | 0% | 100% |
| YK100 | 0% | 0% | 100% | 100% |
| BK1 | 100% | 50% | 0% | 100% |
| BK2 | 50% | 100% | 0% | 100% |
| RK1 | 0% | 100% | 50% | 100% |
| RK2 | 0% | 50% | 100% | 100% |
| GK1 | 50% | 0% | 100% | 100% |
| GK2 | 100% | 0% | 50% | 100% |

(COLOR MATERIAL TOTAL AMOUNT LIMIT: 250%)

|  | CYAN (C) | MAGENTA (M) | YELLOW (Y) | BLACK (K) |
|---|---|---|---|---|
| C100 | 100% | 0% | 0% | 0% |
| M100 | 0% | 100% | 0% | 0% |
| Y100 | 0% | 0% | 100% | 0% |
| B100 | 100% | 100% | 0% | 0% |
| R100 | 0% | 100% | 100% | 0% |
| G100 | 100% | 0% | 100% | 0% |
| CK100 | 100% | 0% | 0% | 100% |
| MK100 | 0% | 100% | 0% | 100% |
| YK100 | 0% | 0% | 100% | 100% |
| BK1 | 100% | 50% | 0% | 100% |
| BK2 | 50% | 100% | 0% | 100% |
| RK1 | 0% | 100% | 50% | 100% |
| RK2 | 0% | 50% | 100% | 100% |
| GK1 | 50% | 0% | 100% | 100% |
| GK2 | 100% | 0% | 50% | 100% |
| BK100 | 100% | 100% | 0% | 100% |
| RK100 | 0% | 100% | 100% | 100% |
| GK100 | 100% | 0% | 100% | 100% |

(COLOR MATERIAL TOTAL AMOUNT LIMIT: 150%)

|  | CYAN (C) | MAGENTA (M) | YELLOW (Y) | BLACK (K) |
|---|---|---|---|---|
| C100 | 100% | 0% | 0% | 0% |
| M100 | 0% | 100% | 0% | 0% |
| Y100 | 0% | 0% | 100% | 0% |
| B1 | 100% | 50% | 0% | 0% |
| B2 | 50% | 100% | 0% | 0% |
| R1 | 0% | 100% | 50% | 0% |
| R2 | 0% | 50% | 100% | 0% |
| G1 | 50% | 0% | 100% | 0% |
| G2 | 100% | 0% | 50% | 0% |
| CK100 | 100% | 0% | 0% | 100% |
| MK100 | 0% | 100% | 0% | 100% |
| YK100 | 0% | 0% | 100% | 100% |
| BK1 | 100% | 50% | 0% | 100% |
| BK2 | 50% | 100% | 0% | 100% |
| RK1 | 0% | 100% | 50% | 100% |
| RK2 | 0% | 50% | 100% | 100% |
| GK1 | 50% | 0% | 100% | 100% |
| GK2 | 100% | 0% | 50% | 100% |

|  | CYAN (C) | MAGENTA (M) | YELLOW (Y) | BLACK (K) |
|---|---|---|---|---|
| C100 | 100% | 0% | 0% | 0% |
| M100 | 0% | 100% | 0% | 0% |
| Y100 | 0% | 0% | 100% | 0% |
| B1 | 100% | 50% | 0% | 0% |
| B2 | 50% | 100% | 0% | 0% |
| R1 | 0% | 100% | 50% | 0% |
| R2 | 0% | 50% | 100% | 0% |
| G1 | 50% | 0% | 100% | 0% |
| G2 | 100% | 0% | 50% | 0% |
| CK50 | 100% | 0% | 0% | 50% |
| MK50 | 0% | 100% | 0% | 50% |
| YK50 | 0% | 0% | 100% | 50% |
| BK1' | 50% | 0% | 0% | 100% |
| BK2' | 0% | 50% | 0% | 100% |
| RK1' | 0% | 50% | 0% | 100% |
| RK2' | 0% | 0% | 50% | 100% |
| GK1' | 0% | 0% | 50% | 100% |
| GK2' | 50% | 0% | 0% | 100% |

(COLOR MATERIAL TOTAL AMOUNT LIMIT: 250%)

|  | CYAN (C) | MAGENTA (M) | YELLOW (Y) | BLACK (K) |
|---|---|---|---|---|
| BK1 | 100% | 50% | 0% | 100% |
| BK2 | 50% | 100% | 0% | 100% |
| RK1 | 0% | 100% | 50% | 100% |
| RK2 | 0% | 50% | 100% | 100% |
| GK1 | 50% | 0% | 100% | 100% |
| GK2 | 100% | 0% | 50% | 100% |
| BK100' | 75% | 75% | 0% | 100% |
| RK100' | 0% | 75% | 75% | 100% |
| GK100' | 75% | 0% | 75% | 100% |

(COLOR MATERIAL TOTAL AMOUNT LIMIT: 150%)

|  | CYAN (C) | MAGENTA (M) | YELLOW (Y) | BLACK (K) |
|---|---|---|---|---|
| BK1' | 50% | 0% | 0% | 100% |
| RK1' | 0% | 50% | 0% | 100% |
| GK1' | 0% | 0% | 50% | 100% |

COLOR GAMUT OUTLINE COMPUTING DEVICE, METHOD, AND PROGRAM STORAGE MEDIUM

CROSS-REFERENCE TO RELATED APPLICATION

This application is based on and claims priority under 35 USC 119 from Japanese Patent Application No. 2008-262751 filed on Oct. 9, 2008.

BACKGROUND

1. Technical Field

The present invention relates to a color gamut (region) outline computing device, method, and program storage medium.

2. Related Art

Color outputting devices such as color laser printers, color inkjet printers, printing machines, CRTs, liquid crystal displays have the device-specific characteristic of a color gamut that is the range of colors that that device can reproduce. The color gamut of the device is used for converting color signals to be outputted into colors that can be outputted at a target device. Accordingly, a technique of computing a color gamut with high accuracy is needed in order to realize highly-accurate color reproduction for different purposes.

In particular, in color outputting devices such as color laser printers and color inkjet printers, there are limitations on the total amount of toners and inks. The limitations on the total amount of the color material are usually imposed on the basis of restrictions such as the output speed, the characteristics of the toners, the characteristics of the fusing device in the case of a color laser printer, and restrictions such as the output speed, the characteristics of the inks, the water-absorbing characteristics of the paper in the case of a color inkjet printer.

SUMMARY

According to an aspect of the present invention, there is provided a color gamut outline computing device having: a setting section that sets a single-color amount limit of at least one color material of device color signals of a device color space of three or more dimensions not including black, and a color material total amount limit of respective device colors; an upper half outline constructing section that constructs an upper half outline, the upper half outline being formed from outline points that are points on a color gamut outline at which one or more color components in the device color space are 0% and that satisfy the single-color amount limit and the color material total amount limit; a lower half outline constructing section that constructs a lower half outline, the lower half outline being formed from outline points that are points on a color gamut outline at which one or more color components in the device color space satisfy the single-color amount limit and that satisfy the color material total amount limit; a restricting outline constructing section that determines a restricting outline formed from outline points that satisfy the single-color amount limit and the color material total amount limit, the outline points of the restricting outline being connected to outline points of the upper half outline or the lower half outline which satisfy the single-color amount limit and the color material total amount limit; and a color space converter that converts outline points of the upper half outline, the lower half outline and the restricting outline into outline points of a color space other than the device color space.

BRIEF DESCRIPTION OF THE DRAWINGS

Exemplary embodiments of the present invention will be described in detail based on the following figures, wherein.

DETAILED DESCRIPTION (First Exemplary Embodiment)

Figure 1:
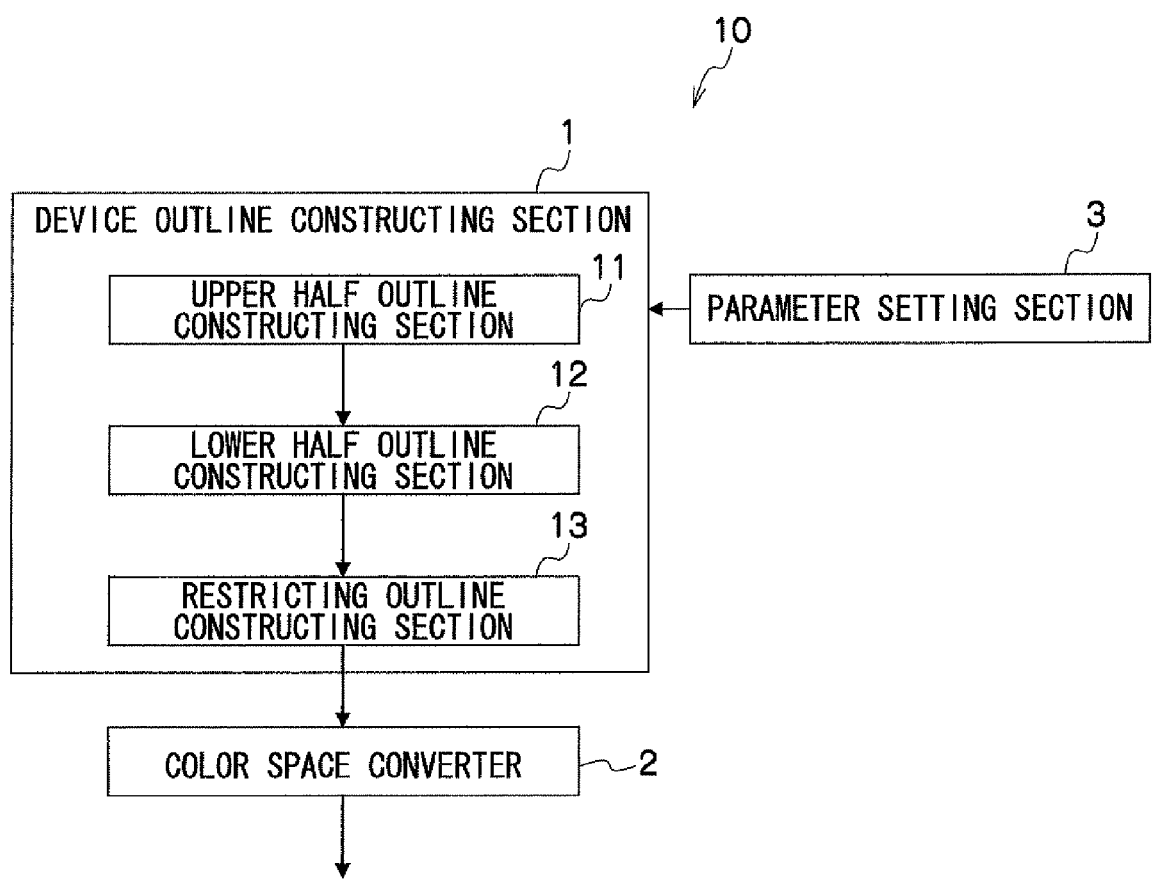
FIG. 1 is a block diagram showing a first exemplary embodiment.

FIG. 1 is a block diagram showing a color gamut outline computing device 10 relating to a first exemplary embodiment. As shown in FIG. 1, the color gamut outline computing device 10 includes a device outline constructing section 1, a color space converter 2, and a parameter setting section 3.

The device outline constructing section 1 includes an upper half outline constructing section 11, a lower half outline constructing section 12, and a restricting outline constructing section 13. Note that, in the first exemplary embodiment, explanation will be given of a case in which the color outputting device, that is the target of determining a color gamut outline, is a device that outputs color images in accordance with device color signals of device color space of larger than or equal to three dimensions not including black, e.g., the CMY color space.

The parameter setting section 3 sets a color material total amount limit that is the maximum value of the total amount of color materials that can be used in order to form a color image at the target color outputting device, and single-color amount limits that are the maximum values of the color materials corresponding to the device color signals of the respective colors. The method for setting the color material total amount limit and the single-color amount limits may include, for example, designating the color material total amount limit and the single-color amount limits by a user through a user interface; or, determining a color material total amount limit and single-color amount limits in advance uniquely for each type of color outputting device or for each output mode that a color outputting device has, and setting the appropriate color material total amount limit and single-color amount limits in accordance with the type of the color outputting device or the output mode that is used. Of course, the color material total amount limit and the single-color amount limits may be provided in advance as fixed values.

The device outline constructing section 1 creates a color gamut outline of device color signals in the device color space of the target color outputting device. Here, as disclosed in JP-A No. 2003-8912 and JP-A No. 2005-63093, which are incorporated herein by reference, for example, when the total amount of the color materials in the device color space is not restricted, in a three-dimensional color space such as the CMY color space or the RGB color space, the color gamut outline is constructed as the surfaces of a cube or a parallelepiped.

However, at the device outline constructing section 1 of the present exemplary embodiment, the color gamut outline must be constructed so as to be structured from only outline points of device color signals that do not exceed all of the single-color amount limits of the respective colors and the color material total amount limit that are set at the parameter setting section 3. Concretely, the color gamut outline is structured by deleting the outline points that exceed at least one of the single-color amount limits of the respective colors and the color material total amount limit, from among the outline points that structure a color gamut outline under the condition that the single-color amount amounts and the total amount of the respective color materials are not restricted.

However, if the single-color amount limits are set, if a single-color amount of an outline point, that is adjacent to an outline point that exceeds a single-color amount limit, is less than the single color amount limit set at the parameter setting section, the exceeded outline point is not deleted. Instead, the exceeded outline point is corrected so as to become equal to the single-color amount limit. For example, if the color outputting device is a CMY printer, the lattice point interval of the color gamut in the CMY color space is a uniform interval of increments of 10%, the single-color amount limits of C, M are 90% and the single-color amount limit of Y is 85%, a point (C, M, Y)=(0%, 90%, 90%) arises next to a point (C, M, Y)=(0%, 90%, 80%) arises, but the former point exceeds the single-color amount limit of Y. Therefore, in order to make this point be less than or equal to the single-color amount limit of Y, the point is changed to (C, M, Y)=(0%, 90%, 85%), and an outline point that is equal to the single-color amount limit is generated.

Further, if the color material total amount of an outline point that is adjacent to an outline point, that satisfies the single-color amount limits of the respective colors but exceeds the color material total amount limit, is less than the color material total amount limit set at the parameter setting section 3, the exceeded outline point will not be deleted. Instead, the exceeded outline point is corrected so as to become equal to the color material total amount limit. Thus, an outline point that is equal to the color material total amount limit is generated.

In the present exemplary embodiment, the device outline constructing section 1 includes an upper half outline constructing section 11, a lower half outline constructing section 12, and a restricting outline constructing section 13. Hereinafter, the upper half outline constructing section 11, the lower half outline constructing section 12, and the restricting outline constructing section 13 will be described in detail.

The upper half outline constructing section 11 constructs an upper half outline of the color gamut outline. The upper half outline is structured only from outline points on the color gamut outline at which one or more color components in the device color space are 0%, and that satisfies the single-color amount limits of the respective colors and the color material total amount limit that are set at the parameter setting section 3. For example, if the device color space is the CMY color space, the upper half outline is structured from outline points that are arranged regularly and at which any of the elements of C, M, Y is 0%, and that do not exceed the single-color amount limits of the respective colors and the color material total amount limit. Here, outline points that are arranged regularly denote outline points that enable adjacent outline points to be specified easily, and the intervals between the adjacent outline points may not necessarily be regular (i.e., may be irregular). In order to simplify explanation here, the embodiment is described that the upper half outline is structured from outline points that are arranged at uniform intervals. The same holds for the lower half outline and the restricting outline that will be described hereinafter: the intervals may be irregular, but for convenience of explanation, in the embodiment the lower half outline and the restricting outline are described to be structured from outline points that are arranged at uniform intervals.

The upper half outline is constructed by deleting outline points on a color gamut outline at which one or more of the color components in the device color space are 0%, and that exceed at least one of the single-color amount limit s of the respective colors and the color material total amount limit. However, if an outline point, that is adjacent to an outline point that exceeds a single-color amount limit, is less than the single-color amount limit, the exceeded outline point is not deleted. Instead, the exceeded outline point is corrected to be equal to the single-color amount limit, and the corrected outline point is included in the upper half outline.

Further, if the color material total amount of an outline point that is adjacent to an outline point, that exceeds the color material total amount limit even though it satisfies the single-color amount limits of the respective colors, is less than the color material total amount limit, the exceeded outline point is not deleted. Instead, the exceeded outline point is corrected to be equal to the color material total amount limit, and the corrected outline point is included in the upper half outline.

The lower half outline constructing section 12 constructs a lower half outline of the color gamut outline of the target color outputting device. The lower half outline is structured from only outline points of device color signals that satisfy the single-color amount limits of the respective colors and the color material total amount limit that are set at the parameter setting section 3. For example, if the device color space is the CMY color space, the lower half outline is structured from points that are arranged regularly and at which any of the elements of C, M, Y is the single-color amount limit thereof, and that do not exceed the color material total amount limit.

The lower half outline is constructed by deleting outline points that are points on a color gamut outline at which one or more of the color components in the device color space are the single-color amount limits thereof, and that exceed at least one of the single-color amount limit s of the respective colors and the color material total amount limit. However, if an outline point, that is adjacent to an outline point that exceeds the single-color amount limits of the respective colors, is less than the single-color amount limits, the exceeded outline point is not deleted. Instead, the exceeded outline point is corrected to be equal to the single-color amount limits, and the corrected outline point is included in the lower half outline.

Further, if the color material total amount of an outline point that is adjacent to an outline point that exceeds the color material total amount limit even though it satisfies the single-color amount limits of the respective colors, is less than the color material total amount limit, the exceeded outline point is not deleted. Instead, the exceeded outline point is corrected to be equal to the color material total amount limit, and the corrected outline point is included in the lower half outline.

Depending on the color material total amount limit that is set at the parameter setting section 3, there may be cases in which a lower half outline does not exist. For example, if the device color space is the CMY color space and the color material total amount limit is less than the smallest single-color amount limit, none of the color components are the single-color amount limit, and therefore, a lower half outline does not exist.

The restricting outline constructing section 13 constructs a restricting outline that is formed from outline points that are arranged regularly and that satisfy the single-color amount limits of the respective colors and the color material total amount limit that are set at the parameter setting section 3. The restricting outline is the outline points of the upper half outline or the lower half outline whose device color signals satisfy the single-color amount limits of the respective colors and the color material total amount limit. The restricting outline is connected to outermost outline points at the dark region side, i e., the lower half outline side of the device color space, and structures the color gamut outline of the color outputting device together with the upper half outline and the lower half outline.

Depending on the color material total amount limit that is set at the parameter setting section 3, there may be cases in which a restricting outline does not exist. For example, if the device color space is the CMY color space and the color material total amount limit of the color outputting device is 300%, i.e., if there is substantially no limitations on the total amount of the color materials, the only outline point that is equal to the color material total amount limit is the outline point that is CMY=(100%, 100%, 100%), and an outline cannot be constructed. Therefore, a restricting outline does not exist.

In this way, the device outline constructing section I has the upper half outline constructing section 11, the lower half outline constructing section 12, and the restricting outline constructing section 13, and constructs an upper half outline, a lower half outline, and a restricting outline, respectively. These outlines are connected at identical (corresponding) outline points in the outlines. Due thereto, a color gamut outline, that does not include black, of the target color outputting device is constructed in the device color space.

At the time of connecting the upper half outline, the lower half outline and the restricting outline, there may be cases in which outline points that do not match (correspond) arise, depending on the single-color amount limits and the color material total amount limit as well as the number of outline points (the interval between the outline points) that is used at the time of constructing the respective outlines at the upper half outline constructing section 11, the lower half outline constructing section 12 and the restricting outline constructing section 13. In these cases, outline points may be it added or corrected such that all of the outline points match at the connection portions.

In the device outline constructing section 1, the constructing of the upper half outline by the upper half outline constructing section 11, the constructing of the lower half outline by the lower half outline constructing section 12, and the constructing of the restricting outline by the restricting outline constructing section 13 may be carried out in an arbitrary order, or may be carried out in parallel.

The color space converter 2 converts the device color signals, that correspond to the outline points that structure the color gamut outline constructed at the device outline constructing section 1, into color signals of the desired color space in which a color gamut is to be constructed. In the exemplary embodiment, a manner of the color space conversion is not limited. Accordingly, any method may be used if it is a method that can convert color signals into that in the desired color space. For example, a defining equation of color conversion may be used, or a physical model such as the Neugebauer model may be used, or a regression equation or a neural network model may be used.

For example, when computing a color gamut in the CIELAB color space that is a device-independent color space, device color signals corresponding to the outline points structuring the color gamut outline constructed at the device outline constructing section 1 may be converted into CIELAB color signals using the method disclosed in JP-A No. 10-262157 which is incorporated herein by reference.

Hereinafter, operations of the respective sections will be described in further detail by using concrete examples. In the following description, the color gamut of a CMY printer, that serves as a color outputting device and forms color images by using color materials of C, M, Y, is computed. Further, at the parameter setting section 3, the single-color amount limits of the respective colors are set to 100% (i.e., no limitations), and the color material total amount limit is set to 250% or 150%, and both cases will be explained.

Figure 2A:
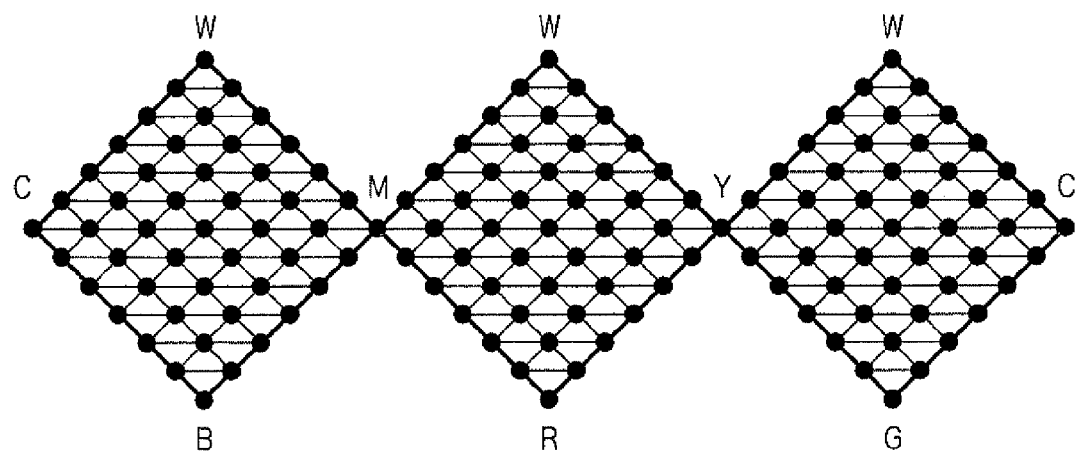
FIG. 2A and FIG. 2B are diagrams illustrating an example of an upper half outline when a color material total amount limit is 250% in the first exemplary embodiment.
Figure 2B:
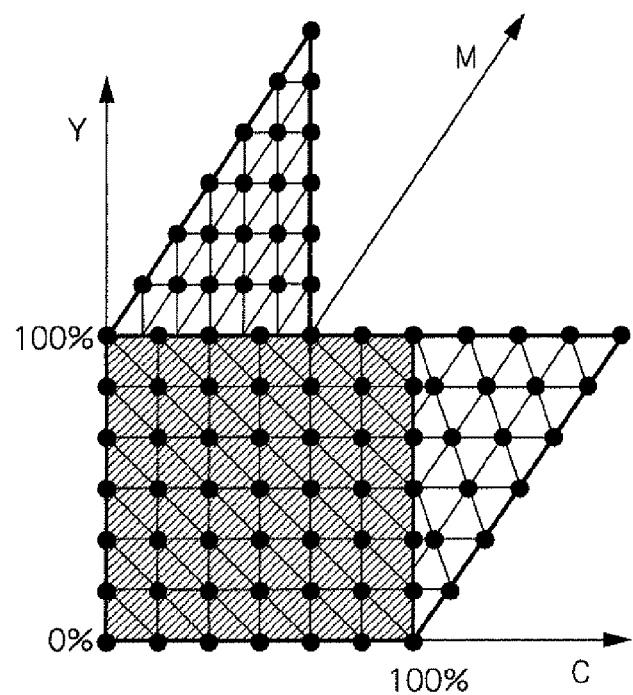
Figure 3A:
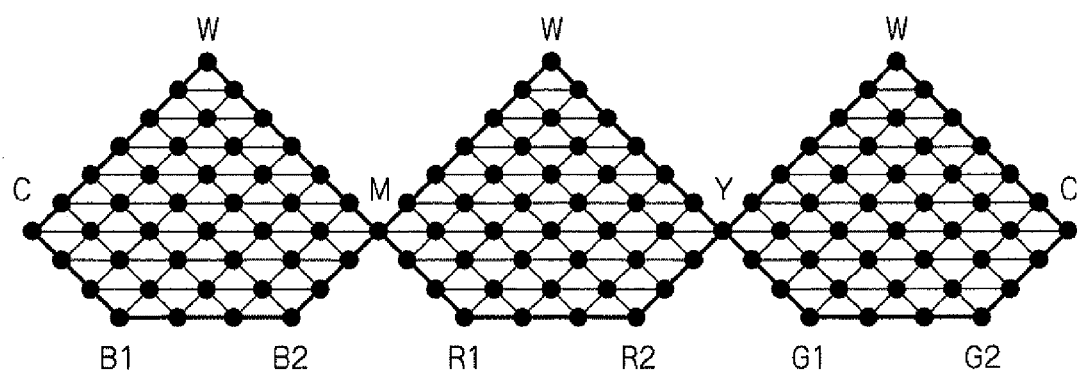
FIG. 3A and FIG. 3B are diagrams illustrating an example of an upper half outline when the color material total amount limit is 150% in the first exemplary embodiment.
Figure 3B:
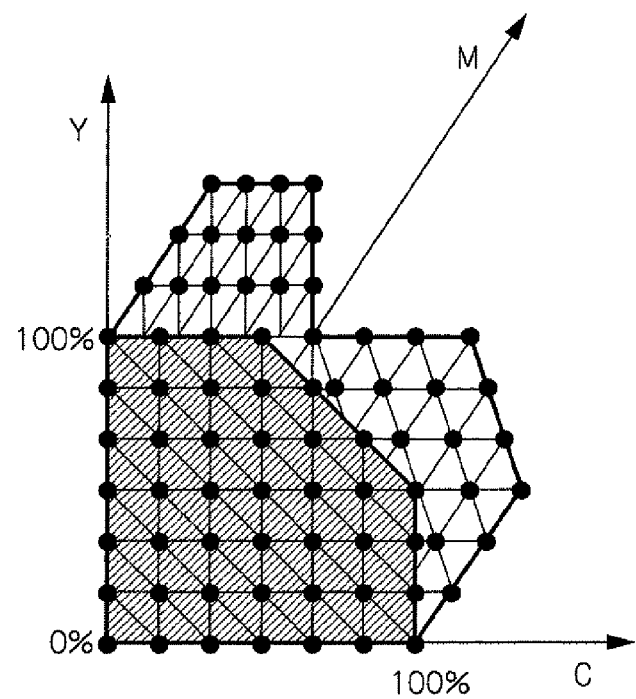

The upper half outline constructing section 11 of the device outline constructing section 1 constructs an upper half outline in the CMY color space that is the device color space. FIG. 2A and FIG. 2B are diagrams illustrating an example of the upper half outline when the single-color amount limits of the respective colors are 100% and the color material total amount limit is 250% in the first exemplary embodiment. FIG. 3A and FIG. 3B are diagrams illustrating an example of the upper half outline when the single-color amount limits of the respective colors are 100% and the color material total amount limit is 150%. FIG. 2A and FIG. 3A are developments of the upper half outlines, and FIG. 2B and FIG. 3B are overhead views of the upper half outlines. Further, the black circles in the drawings are the outline points constructing the upper half outline. By structuring triangles (the solid lines of FIG. 2A and FIG. 3A) by connecting outline points, that are arranged regularly, with adjacent outline points, a polygon group forming the upper half outline is created. Note that, in the developments shown in FIG. 2A and FIG. 3A, the outline points that are lined-up horizontally have equal color material total amounts. This relationship is the same in other developments herein as well.

In a CMY printer C, M, Y that are the respective color components can each take on a value of 0% to 100%. Therefore, a color gamut outline that does not take into consideration the color material total amount limit in the CMY color space will be the surfaces of a cube. Thereamong, the upper half outline is structured by the three surfaces that are contiguous to the origin and the respective axes. When the color material total amount limit is 250% as in the example shown in FIG. 2A and FIG. 2B, the outline points on these surfaces all satisfy the color material total amount limit, and therefore, are outline points structuring the upper half outline.

When the color material total amount limit is 150%, at each of the three surfaces that are contiguous to the origin and the respective axes, the color material total amount limit is not satisfied at some of the outline points. For example, at an outline point at which M=0% and C=Y=100%, C+M+Y=200% which exceeds the 150% that is the color material total amount limit. Accordingly, as shown in FIG. 3A and FIG. 3B, an upper half outline from which portions are missing at each of the surfaces is obtained. If M=0%, the outline points within the surface that satisfies C+Y≦150% structure the upper half outline. In other word, the surface of the upper half outline will be a shape that is cut at 45° by the straight line C+Y=150% (FIG. 3B). To explain with reference to FIG. 3A, a portion of the upper half outline is constructed by outline points that are on or above a horizontal line that connects outline points G1 and G2 of C+Y=150%. Note that the same holds for cases in which C=0%, Y=0%.

Figure 4A:
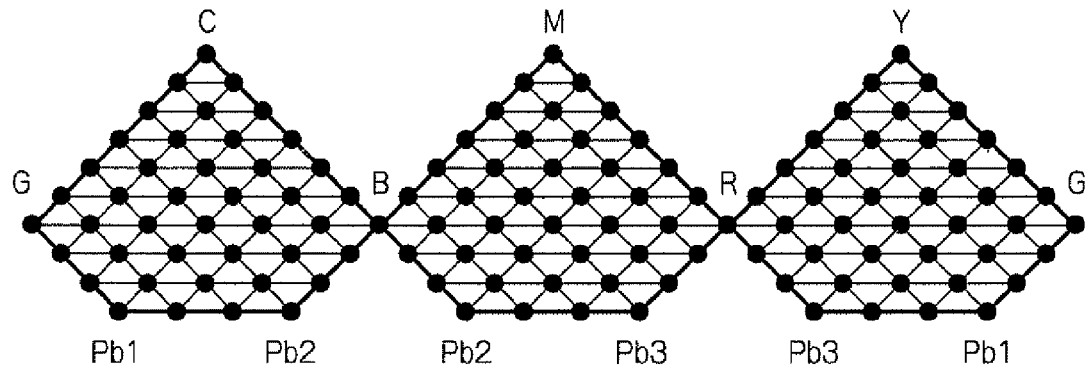
FIG. 4A and FIG. 4B are diagrams illustrating an example of a lower half outline when the color material total amount limit is 250% in the first exemplary embodiment.
Figure 4B:
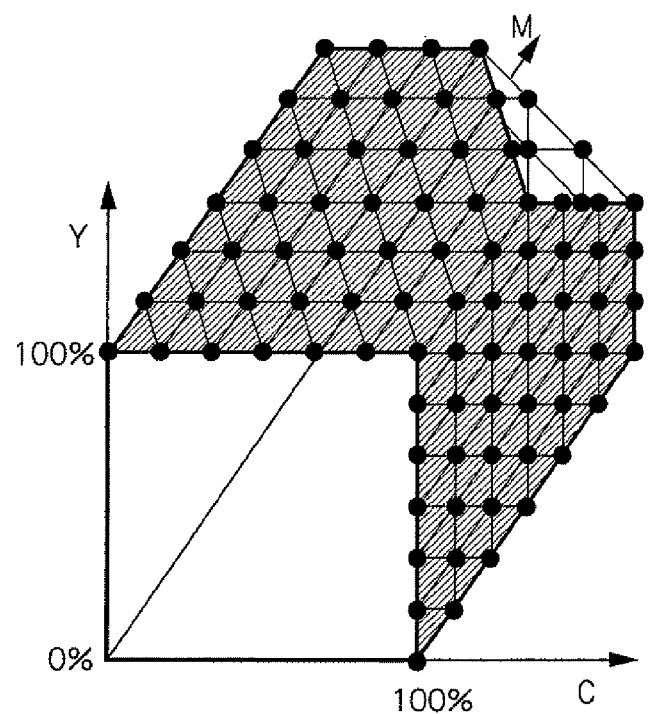
Figure 5A:
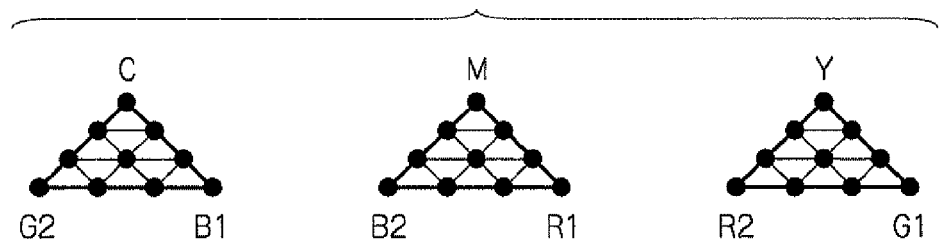
FIG. 5A and FIG. 5B are diagrams illustrating an example of a lower half outline when the color material total amount limit is 150% in the first exemplary embodiment.
Figure 5B:
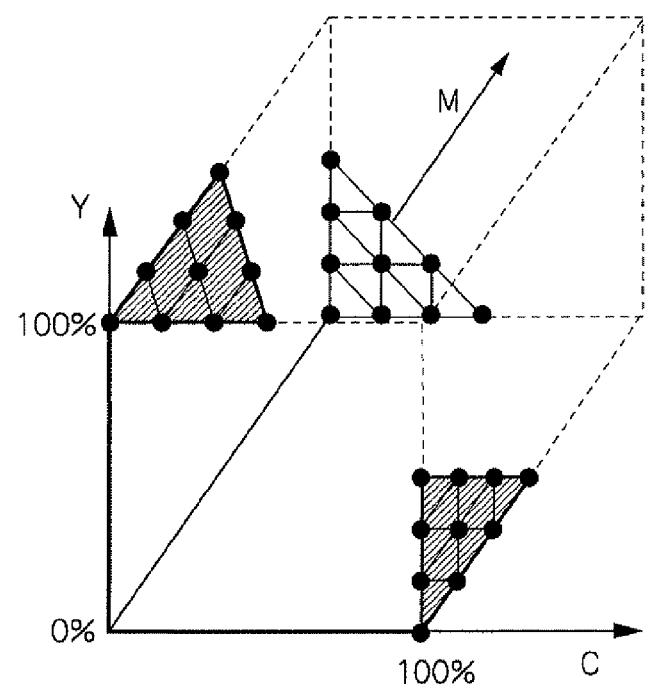

The lower half outline constructing section 12 constructs a lower half outline in the CMY color space that is the device color space. FIG. 4A and FIG. 4B are diagrams illustrating an example of the lower half outline when the color material total amount limit is 250% in the first exemplary embodiment. FIG. 5A and FIG. 5B are diagrams illustrating an example of the lower half outline when the color material total amount limit is 150%. FIG. 4A and FIG. 3A are developments of the lower half outlines, and FIG. 4B and FIG. 5B are overhead views of the lower half outlines. Further, the black circles in the drawings are the outline points structuring the lower half outline. By structuring triangles (the solid lines of FIG. 4A and FIG. 3A) by connecting outline points, that are arranged regularly, with adjacent outline points, a polygon group forming the lower half outline is created.

As described above, a color gamut outline that does not take into consideration the color material total amount limit in the CMY color space in a CMY printer is the surfaces of a cube. Thereamong, the surfaces at which one or more of the color components are 100% are, of the six surfaces of the cube, the three remaining surfaces other than the three surfaces shown in FIG. 2A and FIG. 2B. When the color material total amount limit is 250%, surfaces from which portions of these surfaces are missing are the lower half outline as shown in FIG. 4A and FIG. 4B.

When the color material total amount limit is 150%, the majority of the three surfaces do not satisfy the color material total amount limit, and, as shown in FIG. 3A and FIG. 5B, only triangular portions are the lower half outline. Note that, in FIG. 5B, the color gamut outline that does not take the color material total amount limit into consideration is shown by the dotted lines.

Figure 6A:
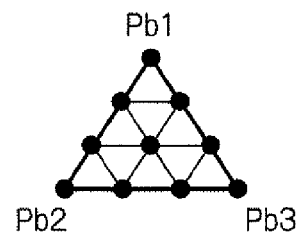
FIG. 6A and FIG. 6B are diagrams illustrating an example of a restricting outline when the color material total amount limit is 250% in the first exemplary embodiment.
Figure 6B:
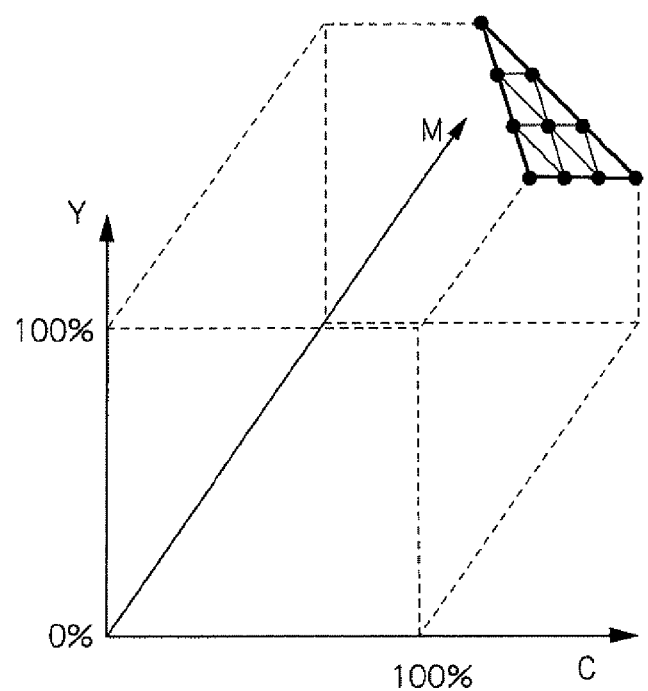
Figure 7A:
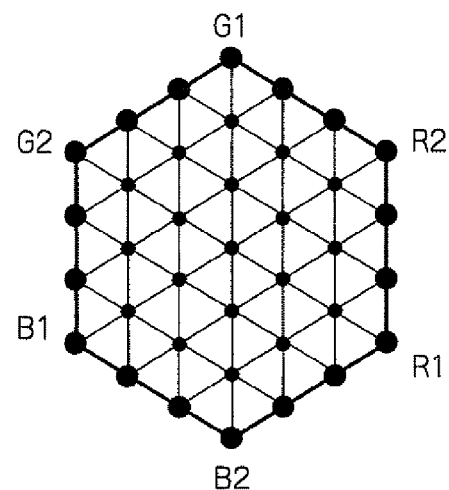
FIG. 7A and FIG. 7B are diagrams illustrating an example of a restricting outline when the color material total amount limit is 150% in the first exemplary embodiment.
Figure 7B:
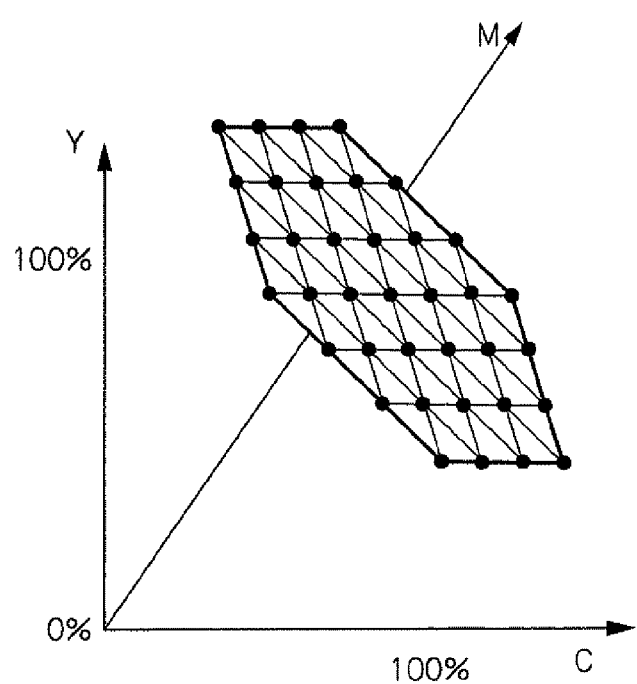

The restricting outline constructing section 13 constructs a restricting outline in the CMY color space that is the device color space. FIG. 6A and FIG. 6B are diagrams illustrating an example of the restricting outline when the color material total amount limit is 250% in the first exemplary embodiment. FIG. 7A and FIG. 7B are diagrams illustrating an example of the restricting outline when the color material total amount limit is 150%. FIG. 6A and FIG. 7A are developments of the restricting outlines, and FIG. 6B and FIG. 7B are overhead views of the restricting outlines. Further, the black circles in the drawings are the outline points constructing the restricting outline. By structuring triangles (the solid lines of FIG. 6A and FIG. 7A) by connecting outline points, that are arranged regularly, with adjacent outline points, a polygon group forming the restricting outline is created.

The restricting outline is a surface that satisfies the color material total amount limit set at the parameter setting section 3, and is a portion of a surface (the surface that is C+M+Y=the color material total amount limit) that is inclined at −45° with respect to the respective axes in the CMY color space. The portion that is surrounded by the intersection lines between this surface and the surfaces of the cube that is the color gamut outline that does not take the color material total amount limit into consideration, is the restricting outline. Concretely, the restricting outline when the color material total amount limit is 250% is shown in FIG. 6A and FIG. 6B. The restricting outline shown in FIG. 6B is the outline surface that closes-off the missing portion of the lower half outline shown in FIG. 4B. Similarly, the restricting outline when the color material total amount limit is 150% is shown in FIG. 7A and FIG. 7B. The restricting outline shown in FIG. 7B is the outline surface that closes-off the missing portion of the lower half outline shown in FIG. 5B and the missing portion of the upper half outline shown in FIG. 3B.

Figure 8:
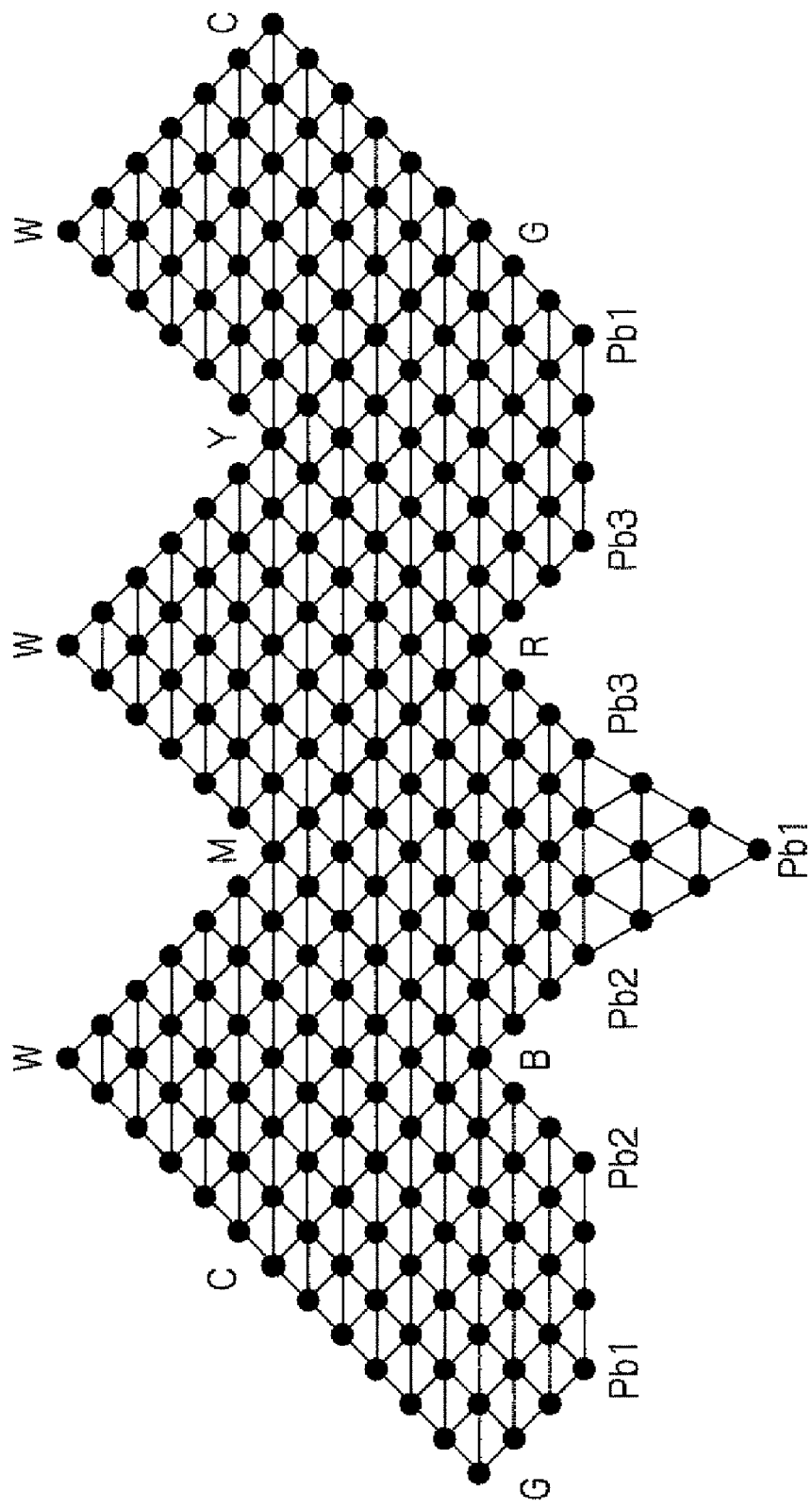
FIG. 8 is a development of an exemplary color gamut outline in the first exemplary embodiment, in which an upper half outline, a lower half outline, and a restricting outline that are determined when the color material total amount limit is 250% are combined.
Figure 9:
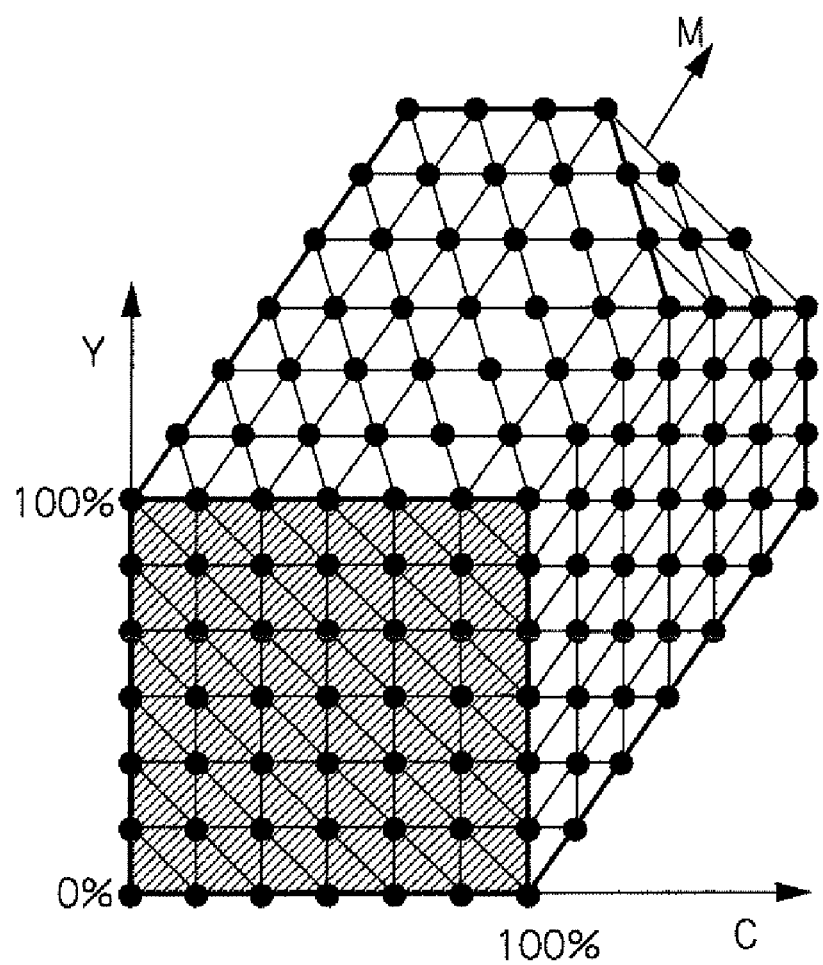
FIG. 9 is an overhead view of the exemplary color gamut outline in the first exemplary embodiment, in which an upper half outline, a lower half outline, and a restricting outline that are determined when the color material total amount limit is 250% are combined.
Figure 10:
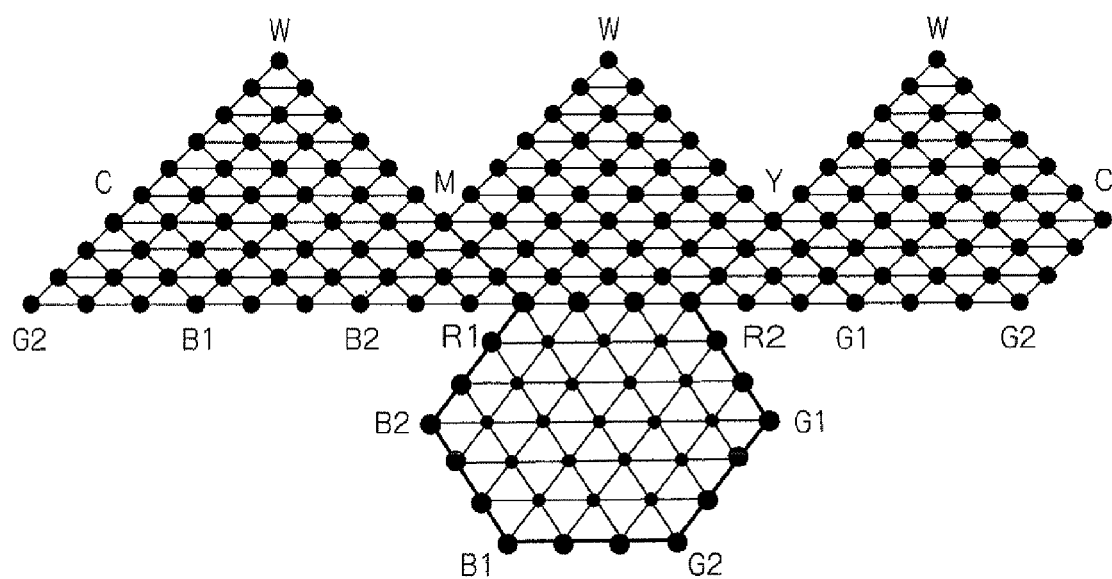
FIG. 10 is a development of an exemplary color gamut outline in the first exemplary embodiment, in which an upper half outline, a lower half outline, and a restricting outline that are determined when the color material total amount limit is 150% are combined.
Figure 11:
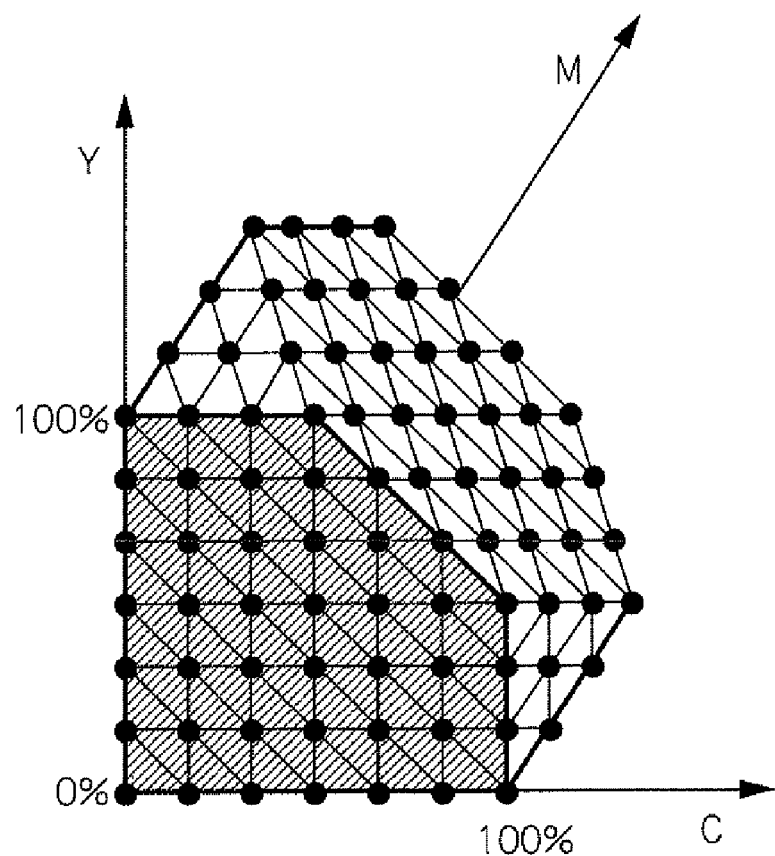
FIG. 11 is an overhead view of the exemplary color gamut outline in the first exemplary embodiment, in which an upper half outline, a lower half outline, and a restricting outline that are determined when the color material total amount limit is 150% are combined.

FIG. 8 is a development of an exemplary color gamut outline that combines an upper half outline, a lower half outline, and a restricting outline that are determined when the color material total amount limit is 250% in the first exemplary embodiment. FIG. 9 is an overhead view thereof. FIG. 10 is a development of an exemplary color gamut outline in which the color material total amount limit is 150% in the first exemplary embodiment, and FIG. 11 is an overhead view thereof. The black circles in the drawings are the outline points constructing the color gamut outline. By structuring triangles (the solid lines of FIG. 8 through FIG. 11) by connecting adjacent outline points, a polygon group forming the color gamut outline is created.

By connecting the upper half outline, the lower half outline and the restricting outline, that are constructed as described above, at the corresponding (matching) outline points that exist at the edge portions, a color gamut outline that satisfies the color material total amount limit of the CMY printer is constructed in the device color space. Outline points that do not match can be made to match by adding outline points or by correcting outline points.

The color gamut outline constructed when the color material total amount limit is 250% is shown in FIG. 8 and FIG. 9. The color gamut outline constructed when the color material total amount limit is 150% is shown in FIG. 10 and FIG. 11. The color gamut outline shown in FIG. 8 and FIG. 9 is an outline that connects the upper half outline shown in FIG. 2, the lower half outline shown in FIG. 4 and the restricting outline shown in FIG. 6. Similarly, the color gamut outline shown in FIG. 10 and FIG. 11 is an outline that connects the upper half outline shown in FIG. 3, the lower half outline shown in FIG. 5, and the restricting outline shown in FIG. 7.

The outline points that structure the color gamut outline that is determined in this way are converted into color signals of a desired color space at the color space converter 2. For example, the outline points may be converted into the CIELAB color space that is a device-independent color space.

(Second Exemplary Embodiment)

A second exemplary embodiment will be described next. In the second exemplary embodiment, description will be given of a case in which the target color outputting device for which a color gamut outline is determined outputs color images in accordance with device color signals of a device color space that includes four or more dimensions including black, e.g., the CMYK color space.

Figure 12:
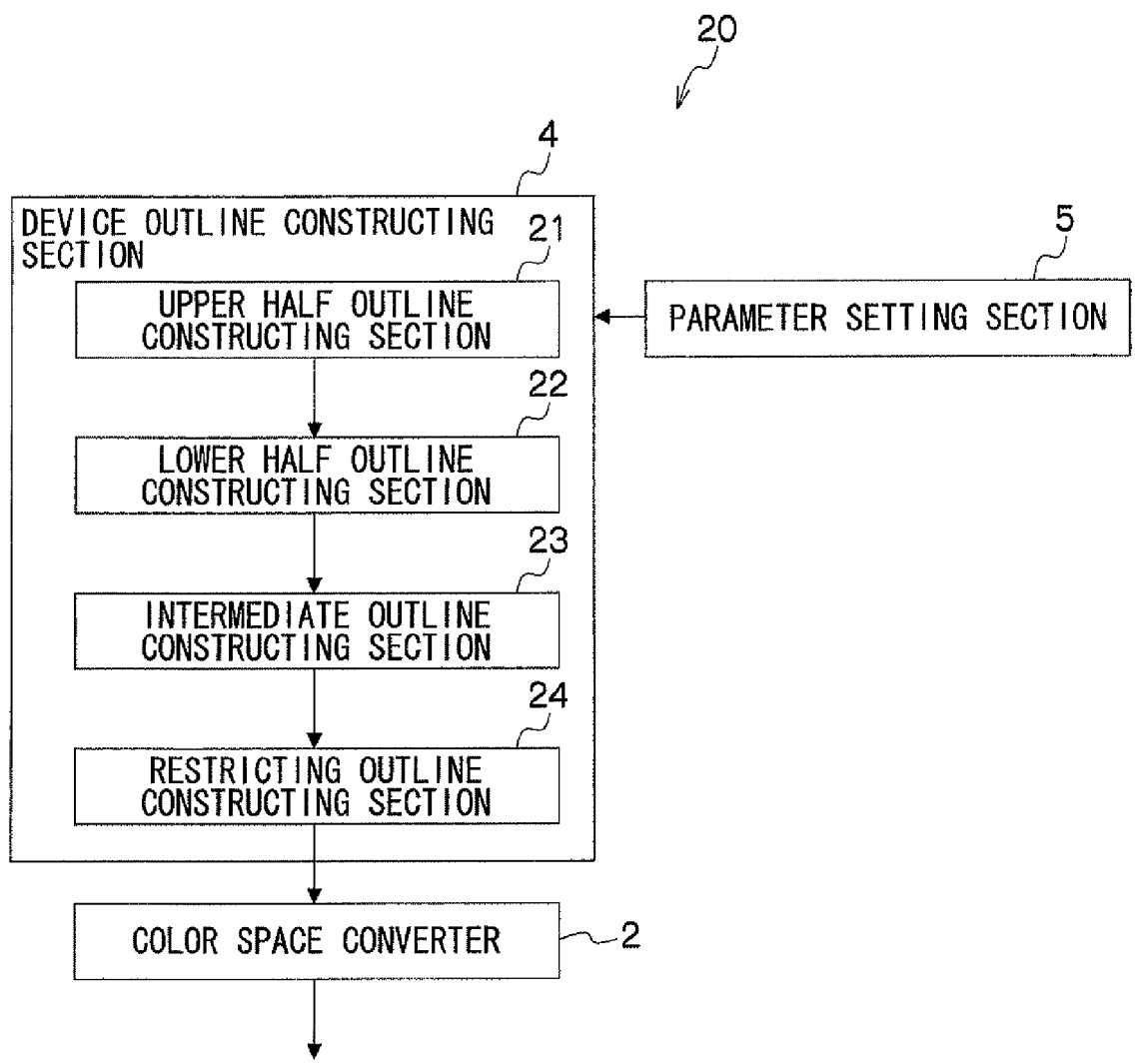
FIG. 12 is a block diagram showing a second exemplary embodiment.

FIG. 12 is a block diagram showing a color gamut outline computing device 20 relating to the second exemplary embodiment. Sections that are the same as those of the color gamut outline computing device 10 shown in FIG. 1 are denoted by the same reference numerals and detailed description thereof is omitted.

As shown in FIG. 12, the color gamut outline computing device 20 includes a device outline constructing section 4, the color space converter 2, and a parameter setting section 5.

The device outline constructing section 4 includes an upper half outline constructing section 21, a lower half outline constructing section 22, an intermediate outline constructing section 23, and a restricting outline constructing section 24.

The parameter setting section 5 sets an upper half color material total amount limit of an upper half region of the device color space of four or more dimensions including black, and a lower half color material total amount limit of a lower half region of the device color space, and single-color amount limits of the respective colors. As the method for setting the upper half color material total amount limit, the lower half color material total amount limit and the single-color amount limits of the respective colors, for example, these values may be designated by a user through a user interface. Or, the upper half color material total amount limit, the lower half color material total amount limit and the single-color amount limits of the respective colors may be determined in advance uniquely for each type of color outputting device or for each output mode that a color outputting device has, and the appropriate upper half color material total amount limit, lower half color material total amount limit and single-color amount limits may be set in accordance with the type of the color outputting device or the output mode that is used. Alternately, these values may be provided in advance as fixed values.

Figure 13A:
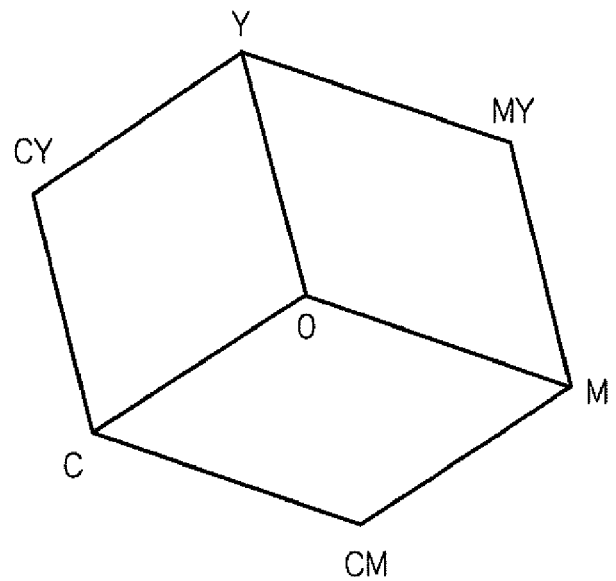
FIG. 13A and FIG. 13B are drawings illustrating an example of a color gamut outline in the CMYK color space.
Figure 13B:
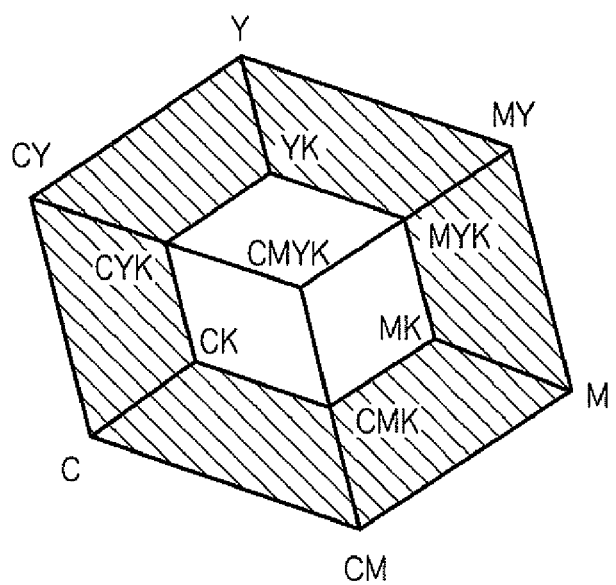

The device outline constructing section 4 creates a color gamut outline in the device color space of the target color outputting device. FIG. 13A and FIG. 13B are drawings illustrating an example of a color gamut outline in the CMYK color space. For example, a color gamut outline in the CMYK color space, that is a four-dimensional color space including black (K), will be a polyhedron having 12 surfaces as shown in FIG. 13A and FIG. 13B. Note that, for convenience of illustration, the three surfaces at which at least one of CMYK is 0% is shown in FIG. 13A, and the other 9 surfaces are shown in FIG. 13B.

However, at the device outline constructing section 4 in the second exemplary embodiment, the color gamut outline must be constructed only from outline points of device color signals that do not exceed the single-color amount limits of the respective colors and the color material total amount limits that are set at the parameter setting section 5. Concretely, in a color gamut outline under the condition that the total amount of the color materials is not restricted, the outline points of the upper half outline (the three surfaces shown in FIG. 13A), that exceed at least one of the single-color amount limits of the respective colors and the upper half color material total amount limit, are deleted. Further, the outline points of the lower half outline (the three surfaces that are not hatched in FIG. 13B), that exceed at least one of the single-color amount limits of the respective colors and the lower half color material total amount limit, are deleted.

For the intermediate outline (the six surfaces that are hatched in FIG. 13B), an intermediate color material total amount limit of an intermediate region between the upper half region and the lower half region in the device color space, is determined on the basis of the upper half color material total amount limit and the lower half color material total amount limit. Then, the outline points of the intermediate outline, that exceed at least one of the single-color amount limits of the respective colors and the intermediate color material total amount limit, are deleted.

Further, a restricting outline formed from outline points that satisfy the single-color amount limits of the respective colors, and satisfy at least one of the upper half color material total amount limit, the intermediate color material total amount limit and the lower half color material total amount limit, is constructed. The outline points of the restricting outline are connected to outline points of at least one of the upper half outline, the intermediate outline and the lower half outline whose device color signals satisfy at least one of the upper half color material total amount limit, the intermediate color material total amount limit and the lower half color material total amount limit, and that are at the outermost portion of the dark portion region side, i.e., the lower half outline side. Thus, the color gamut outline is structured from only the outline points of device color signals that do not exceed the single-color amount limits of the respective colors and the respective color material total amount limits.

In the second exemplary embodiment, the device outline constructing section 4 includes the upper half outline constructing section 21, the lower half outline constructing section 22, the intermediate outline constructing section 23 and the restricting outline constructing section 24. Hereinafter, the upper half outline constructing section 21, the lower half outline constructing section 22, the intermediate outline constructing section 23 and the restricting outline constructing section 24 will be described in detail.

The upper half outline constructing section 21 constructs an upper half outline of the color gamut outline of the target color outputting device. The upper half outline is structured from only outline points that are points on a color gamut outline at which K=0% and one or more other color components are 0% in the device color space of four or more dimensions including black, and that satisfy the upper half color material total amount limit and the single-color amount limits of the respective colors. For example, if the device color space is the CMYK color space, the upper half outline is structured by the outline points that are arranged regularly and at which K=0% and any elements of C, M, Y are 0%, and that do not exceed the upper half color material total amount limit and the single-color amount limits of the respective colors. Here, outline points that are arranged regularly denote outline points that enable adjacent outline points to be specified easily, and the intervals between the adjacent outline points may not necessarily be regular (i.e., may be irregular). In order to simplify explanation here, it is considered that the upper half outline is structured from outline points that are arranged at uniform intervals. The same holds for the lower half outline, the intermediate outline and the restricting outline that will be described hereinafter: the intervals may be irregular, but for convenience of explanation, they are structured from outline points that are arranged at uniform intervals.

The upper half outline is constructed by deleting outline points that are points on a color gamut outline at which K=0% and one or more other color components are 0% in the device color space, and that exceed at least one of the single-color amount limits of the respective colors and the upper half color material total amount limit. However, if an outline point, which is adjacent to an outline point that exceeds a single-color amount limit, is less than the single-color amount limit, the exceeded outline point is not deleted. Instead, the exceeded outline point is corrected to be equal to the single-color amount limit. Due thereto, outline points that are equal to the single-color amount limits are provided.

Further, if the color material total amount of an outline point that is adjacent to an outline point, which exceeds the upper half color material total amount limit although it satisfies the single-color amount limits of the respective colors, is less than the upper half color material total amount limit, the exceeded outline point is not deleted. Instead, the exceeded outline point is corrected to be equal to the upper half color material total amount limit, and the corrected outline point is included in the upper half outline.

The lower half outline constructing section 22 constructs a lower half outline of the color gamut outline. The lower half outline is structured from only outline points that are points on a color gamut outline at which K=the single-color amount limit of K and one or more other color components are the single-color amount limit of that color component in the device color space of four or more dimensions including black, and device color signals thereof satisfy the lower half color material total amount limit set at the parameter setting section 5. For example, if the device color space is the CMYK color space and the single-color amount limits of the respective colors are all 100%, the lower half outline is formed by the outline points that are arranged regularly and at which K=100% and any element of C, M, Y is 100%, and that do not exceed the single-color amount limits of the respective colors and the lower half color material total amount limit.

The lower half outline is determined by deleting outline points that are points on a color gamut outline at which K=the single-color amount limit of K and one or more other color components are the single-color amount limit of that color component in the device color space, and that exceed at least one of the single-color amount limits of the respective colors and the lower half color material total amount limit.

However, if an outline point, which is adjacent to an outline point that exceeds a single-color amount limit, is less than the single-color amount limit, the exceeded outline point is not deleted. Instead, the exceeded outline point is corrected to be equal to the single-color amount limit. Due thereto, outline points that are equal to the single-color amount limits are formed.

Further, if the color material total amount of an outline point that is adjacent to an outline point, which exceeds the lower half color material total amount limit although it satisfies the single-color amount limits of the respective colors, is less than the lower half color material total amount limit, the exceeded outline point is not deleted. Instead, the exceeded outline point are corrected to be equal to the lower half color material total amount limit, and the corrected outline point is included in the lower half outline.

Depending on the single-color amount limits and the upper half color material total amount limit that are set at the parameter setting section 5, there may be cases in which a lower half outline does not exist. For example, if the device color space is the CMYK color space and the single-color amount limits of the color outputting device are all 100% and the upper half color material total amount limit is 190%, it is not possible for any of C, M, Y to be 100% and K=100%. Therefore, none of the outline points of the lower half outline satisfy the upper half color material total amount limit, and a lower half outline does not exist.

The intermediate outline constructing section 23 constructs an intermediate outline of the color gamut outline. On the basis of the upper half color material total amount limit and the lower half color material total amount limit that are set at the parameter setting section 5, the intermediate outline constructing section 23 determines, in accordance with the black amount, an intermediate color material total amount limit of the color material total amount in an intermediate region between the upper half region and the lower half region.

Figure 14:
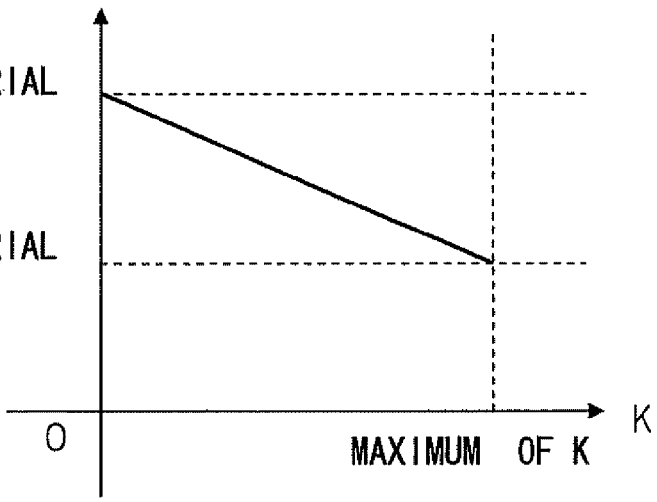
FIG. 14 is a graph showing the relationship between black amount at a time of determining the intermediate color material total amount limit and the intermediate color material total amount limit.

As shown in FIG. 14 for example, the intermediate color material total amount limit is set so as to become smaller as the value of black becomes larger between the upper half color material total amount limit and the lower half color material total amount limit. In other words, the intermediate color material total amount limit is set such that, the smaller the value of black, i.e., the more the device color signals move toward the upper half side of the color gamut, the more the intermediate color material total amount limit approaches the upper half color material total amount limit, and, the larger the value of black, i.e., the more the device color signals move toward the lower half side of the color gamut, the more the intermediate color material total amount limit approaches the lower half color material total amount limit. As shown in FIG. 14, it is preferable that the upper half color material total amount limit is larger than the lower half color material total amount limit.

Figure 15:
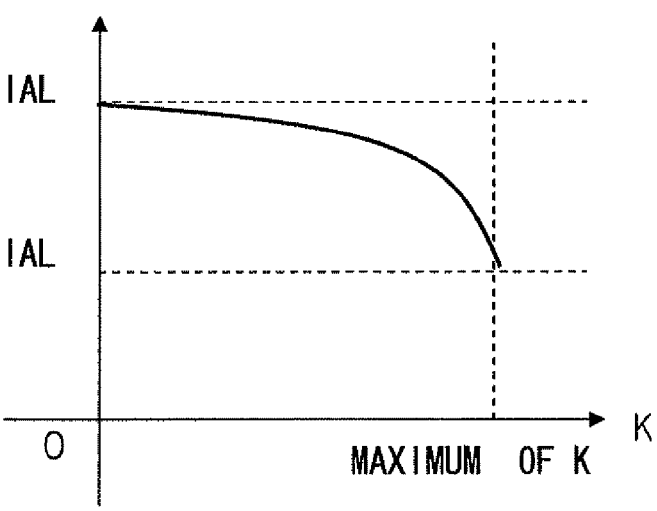
FIG. 15 is a graph showing another example of the relationship between black amount at a time of determining the intermediate color material total amount limit and the intermediate color material total amount limit.

In this way, the intermediate outline constructing section 23 determines the intermediate color material total amount limit from the upper half color material total amount limit and the lower half color material total amount limit, in accordance with the amount of black. When a single-color amount limit is set for black (K), the maximum value of K shown in FIG. 14 is the single-color amount limit of K. From the upper half color material total amount limit to the lower half color material total amount limit, the intermediate color material total amount limit may be varied linearly in accordance with the value of K as shown in FIG. 14, or, may be varied non-linearly as shown in FIG. 15.

The intermediate outline is structured from only outline points that are on a color gamut outline at which one or more of the color components other than black are the single-color amount limits of those components and one or more color components other than black are 0% in the device color space, and that satisfy the single-color amount limits of the respective colors and the intermediate color material total amount limit. For example, if the device color space is the CMYK color space, the intermediate outline is structured by outline points that are arranged regularly and at which any element of C, M, Y is the single-color amount limit of that color component and any element of C, M, Y is 0%, and that do not exceed the single-color amount limits of the respective colors and the intermediate color material total amount limit.

The intermediate outline is determined by deleting outline points that are points on a color gamut outline at which the color components other than K are the single-color amount limits of those color components and one or more other color components are 0% in the device color space, and that exceed at least one of the single-color amount limits of the respective colors and the lower half color material total amount limit.

However, if an outline point, which is adjacent to an outline point that exceeds the single-color amount limit, is less than the single-color amount limit, the exceeded outline point is not deleted. Instead, the exceeded outline point is corrected to be equal to the single-color amount limit. Due thereto, outline points that are equal to the single-color amount limit s are formed.

Further, if the color material total amount of an outline point that is adjacent to an outline point, which exceeds the intermediate color material total amount limit although it satisfies the single-color amount limits of the respective colors, is less than the intermediate color material total amount limit, the exceeded outline point is not deleted. Instead, the device color signals of the exceeded outline point are corrected to be equal to the intermediate color material total amount limit, and the corrected outline point is included in the intermediate outline.

Depending on the single-color amount limit of K that is set at the parameter setting section 5, there may be cases in which an intermediate outline does not exist. Namely, an intermediate outline does not exist in cases in which the single-color amount limit of K is 0%.

Usually, with regard to outline points that exceed the intermediate color material total amount limit, the outline point is corrected and the color material total amount is restricted by subtracting equal amounts from each of K and the color components that are other than 0%. However, when the upper half color material total amount limit is less than the sum of the single-color amount limits of two adjacent colors (C and M, M and Y, Y and C), if the color material total amount restrict using the above-described method with respect to the point K=0% that is the portion where the intermediate outline contacts the upper half outline, mismatching will arise between the numbers of the outline points at the joined portion of the upper half outline and the intermediate outline.

Figure 16:
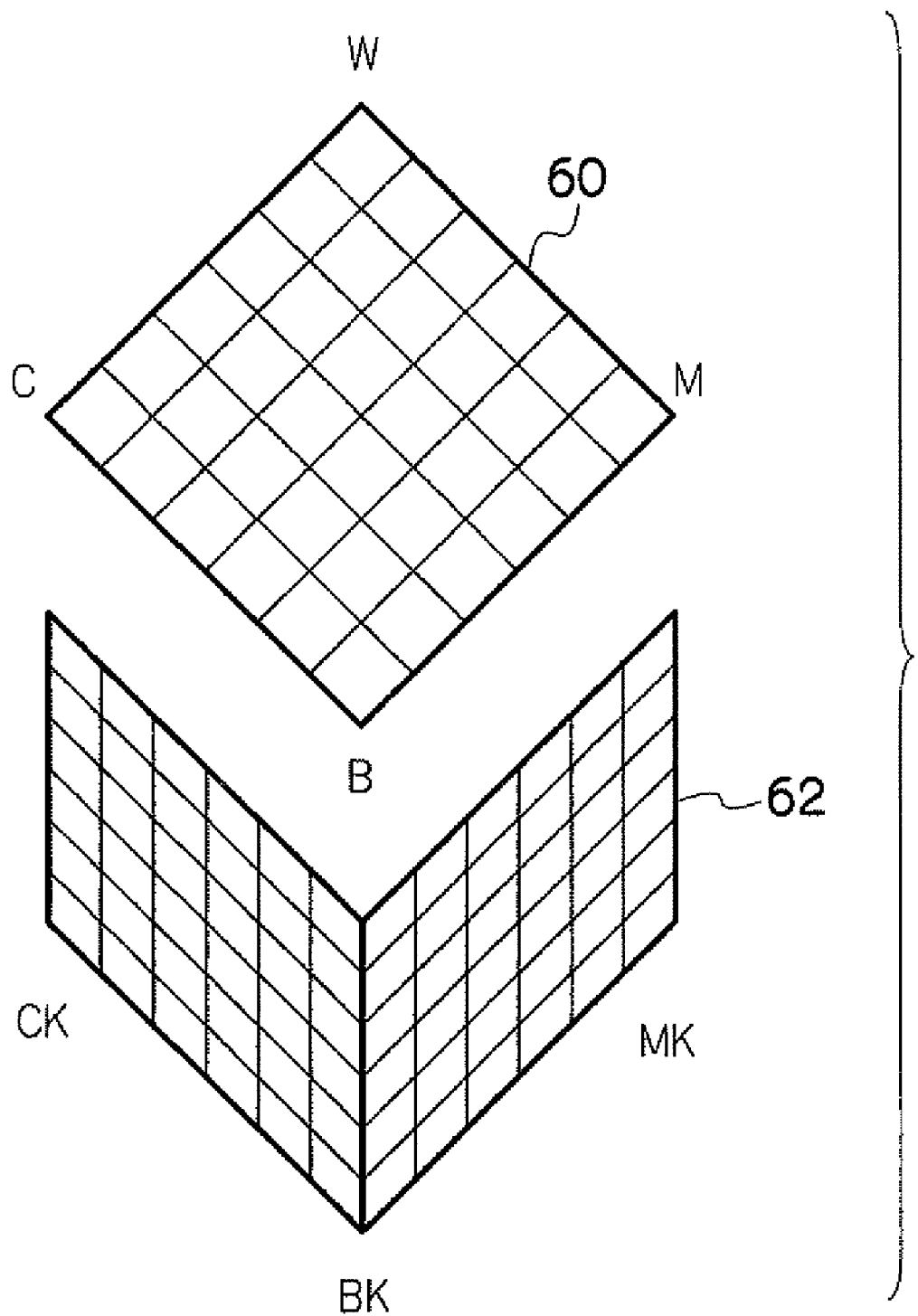
FIG. 16 is a development of an upper half outline and an intermediate outline when an upper half color material total amount limit is larger than or equal to 200%.

For example, if the single-color amount limits of the respective colors are 100%, i.e., if there are no limitations, and if the upper half color material total amount limit is larger than or equal to the sum of the single-color amount limits of two adjacent colors (C and M, M and Y, Y and C), i.e., 200%, the total amount limit line is positioned at the lower side of B (blue) in FIG. 16. Therefore, an upper half outline 60 will not be cut-off and maintains a square shape, and the portion that is joined with an intermediate outline 62 will be the shape as is.

Figure 17:
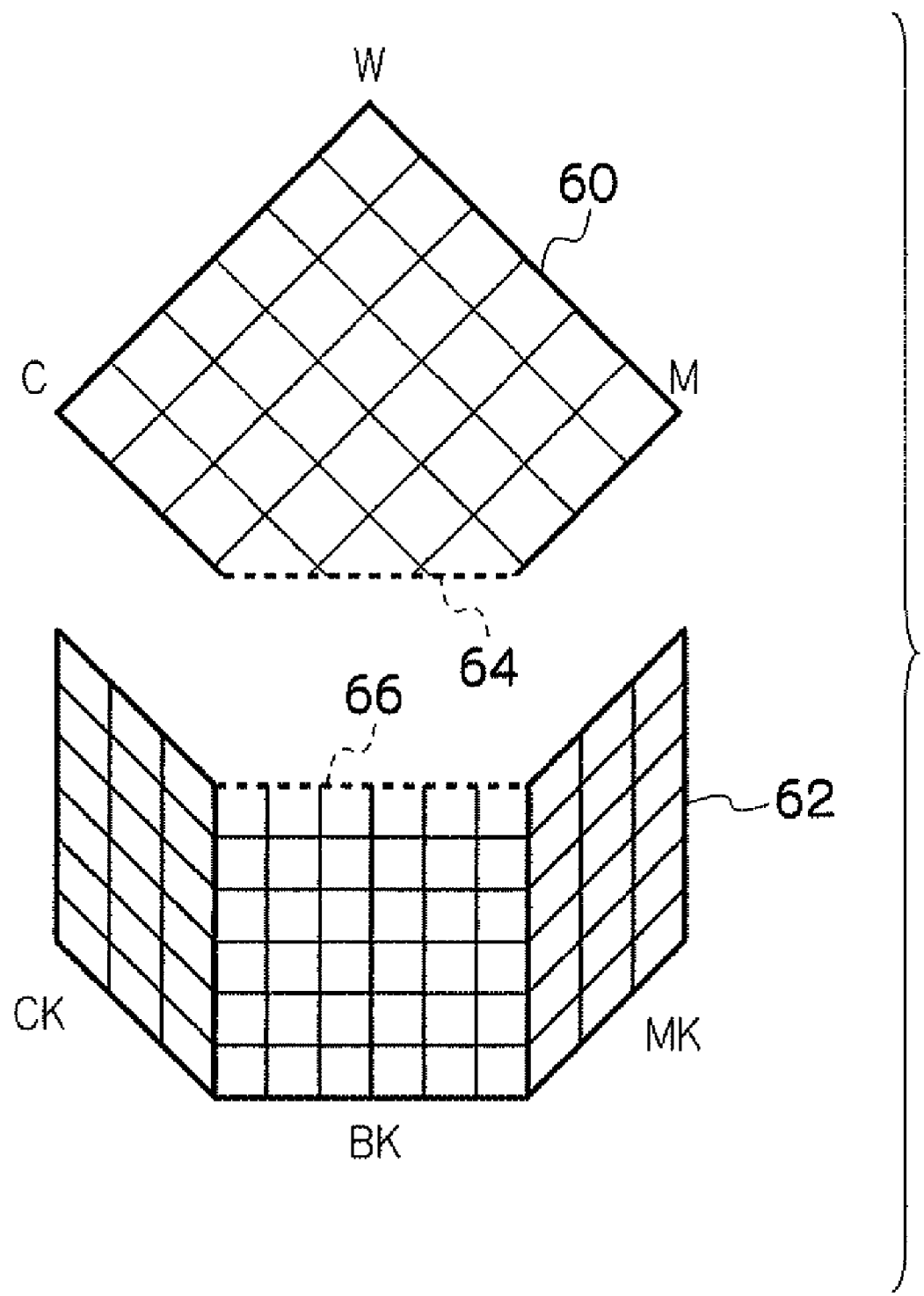
FIG. 17 is a development of an upper half outline and an intermediate outline when the upper half color material total amount limit is less than 200%.

In contrast, if the upper half color material total amount limit is larger than or equal to 200%, the total amount limit line is positioned at the upper side of B in FIG. 16. Therefore, as shown in FIG. 17, the upper half outline 60 will be a shape that is cut-off at a total amount limit line 64. Further, if the outline points of the intermediate outline are corrected by the above-described method, mismatching arises between the numbers of outline points at the joined portion of the upper half outline and the intermediate outline. In the example of FIG. 17, there are four outline points of the upper half outline 60 on the total amount limit line 64, whereas there are seven outline points of the intermediate outline 62 on a joining line 66 with the upper half outline.

This is because, outline points that exceed the color material total amount are cut when constructing the upper half outline, whereas, when constructing the intermediate outline, outline points that exceed the color material total amount are not deleted, and rather, the CMYK values are compressed and all of the outline points are maintained.

Accordingly, in order to make it such that mismatching does not occur at the joining line of the upper half outline and the intermediate outline as described above, all of the outline points that are on the joining line of the upper half outline and the intermediate outline must be made to match.

Figure 18:
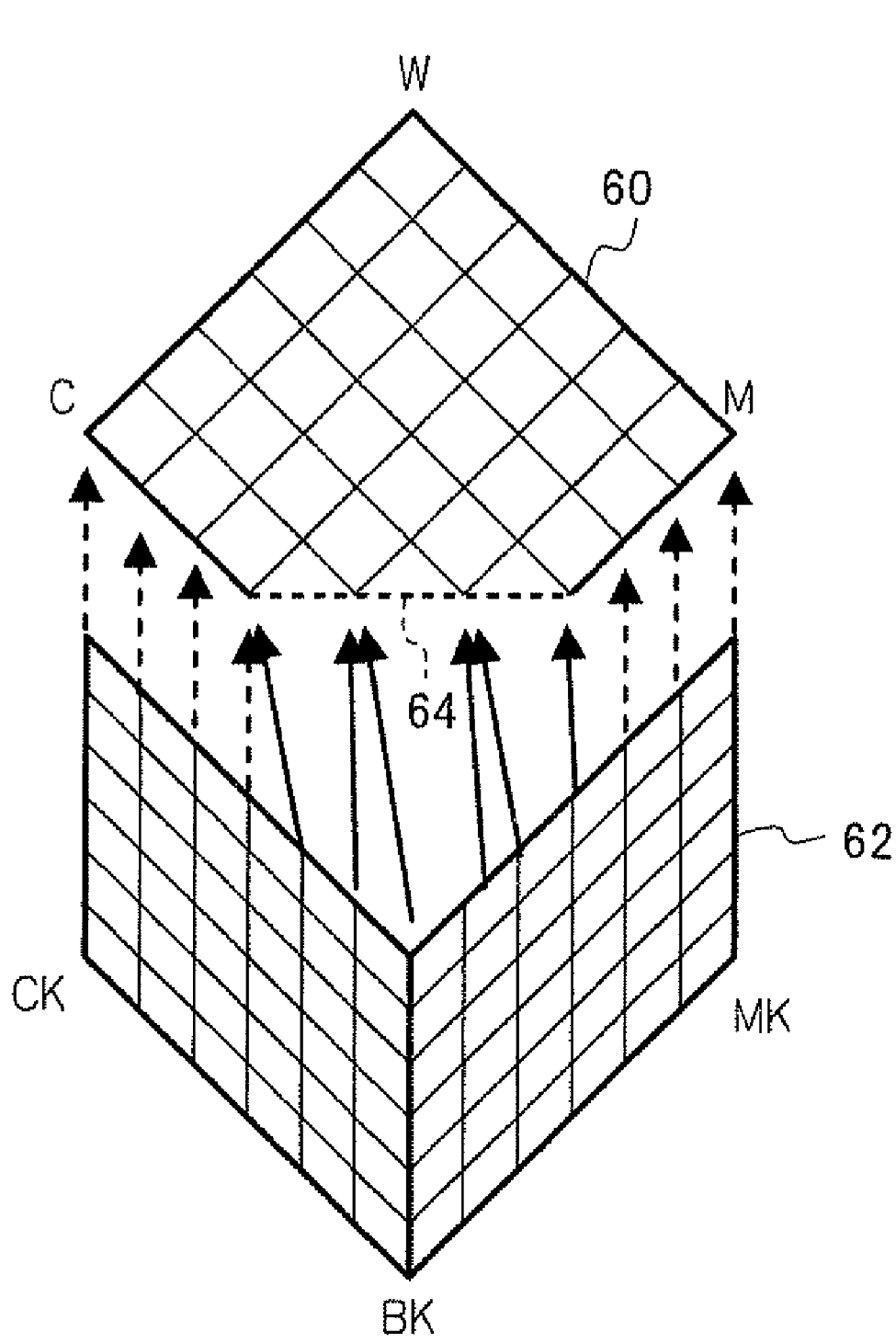
FIG. 18 is a drawing for illustrating adjustment of outline points at a joining line of the upper half outline and the intermediate outline when the upper half color material total amount limit is less than 200%.

Thus, as shown in FIG. 18, the intermediate outline constructing section 23 identifies the outline points on the total amount limit line 64 that correspond to the upper half color material total amount limit of the upper half outline 60 (in FIG. 18, four outline points are identified). The outline points of the intermediate outline 62, that are at positions corresponding to the total amount limit line 64, are corrected or deleted so as to match the identified outline points. In the example shown in FIG. 18, there are seven of the outline points of the intermediate outline 62 that are at positions corresponding to the total amount limit line 64. Therefore, for example, of the seven outline points of the intermediate outline 62 that are at positions corresponding to the total amount limit line 64, three outline points are corrected to be the same values as the outline points adjacent thereto, as shown by the solid arrows in the drawing.

The restricting outline constructing section 24 constructs a restricting outline from the outline points that satisfy the single-color amount limits of the respective colors, the upper half color material total amount limit, the intermediate color material total amount limit, and the lower half color material total amount limit. Together with the upper half outline, the intermediate outline and the lower half outline, the restricting outline structures the color gamut outline of the color outputting device by being connected to the outermost outline points among the outline points of the upper half outline, the intermediate outline and the lower half outline whose device color signals satisfy the single-color amount limits of the respective colors, the upper half color material total amount limit, the intermediate color material total amount limit, and the lower half color material total amount limit.

Depending on the lower half color material total amount limit that is set at the parameter setting section 5, there may be cases in which a restricting outline does not exist. For example, if the device color space is the CMYK color space and the lower half color material total amount limit of the color outputting device is 400%, i.e., if there is substantially no limitations on the total amount of the color materials, the only outline point equal to the lower half color material total amount limit is CMYK=(100%, 100%, 100%, 100%), and an outline cannot be structured. Therefore, a restricting outline does not exist.

As described above, the device outline constructing section 4 has the upper half outline constructing section 21, the lower half outline constructing section 22, the intermediate outline constructing section 23 and the restricting outline constructing section 24, and constructs an upper half outline, a lower half outline, an intermediate outline and a restricting outline, respectively. By connecting these outlines at corresponding outline points on the outlines, a color gamut outline of the device color space is constructed.

When connecting the upper half outline, the lower half outline, the intermediate outline and the restricting outline, there may be cases in which outline points that do not match (correspond) arise, depending on the color material total amount limit and the numbers of outline points (the intervals between the outline points) that are used at the time of constructing the respective outlines at the upper half outline constructing section 21, the lower half outline constructing section 22, the intermediate outline constructing section 23 and the restricting outline constructing section 24. In this case, outline points may be added or corrected such that all of the outline points match at the connection portions.

In the device outline constructing section 4, the constructing of the upper half outline by the upper half outline constructing section 21, the constructing of the lower half outline by the lower half outline constructing section 22, the constructing of the intermediate outline by the intermediate outline constructing section 23, and the constructing of the restricting outline by the restricting outline constructing section 24 may be carried out in an arbitrary order, or may be carried out in parallel.

The color space converter 2 converts the device color signals, that correspond to the outline points that structure the color gamut outline constructed at the device outline constructing section 4 as described above, into color signals of the desired color space that a color gamut is to be constructed. In the present exemplary embodiment, the color space conversion of the conversion destination is not limited. Accordingly, any method may be used as if it is a method that can convert into color signals in the desired color space. For example, a defining equation of color conversion may be used, or a physical model such as the Neugebauer model may be used, or a regression equation or a neural network model may be used.

For example, when computing a color gamut in the CIELAB color space that is a device-independent color space, device color signals corresponding to the outline points structuring the color gamut outline in the device color space constructed at the device outline constructing section 4 may be converted into CIELAB color signals using the method disclosed in JP-A No. 10-262157, which is incorporated herein by reference.

Hereinafter, operations of the respective sections will be described further by using detail examples. In the following description, the color gamut of a CMYK printer, that serves as a color outputting device and forms color images by using color materials of C, M, Y, K, is computed. Further, at the parameter setting section 5, the single-color amount limits of the respective colors are set to 100% (i.e., no limitations), and the upper half color material total amount limit is set to 250% or 150%, and both cases will be explained. In order to simplify explanation, description will be given of a case in which when the upper half color material total amount limit is 250%, the lower half color material total amount limit, is set to 250% which is the same as the upper half color material total amount limit. In this case, the intermediate color material total amount limit also will be 250%, regardless of the value of K. Further, in order to simplify explanation, description will be given of a case in which when the upper half color material total amount limit is 150%, the intermediate color material total amount limit is set to 150% which is the same as the upper half color material total amount limit. Note that, when the upper half color material total amount limit is 150%, the lower half outline will not be constructed as was described previously.

Figures 19A, 19B:
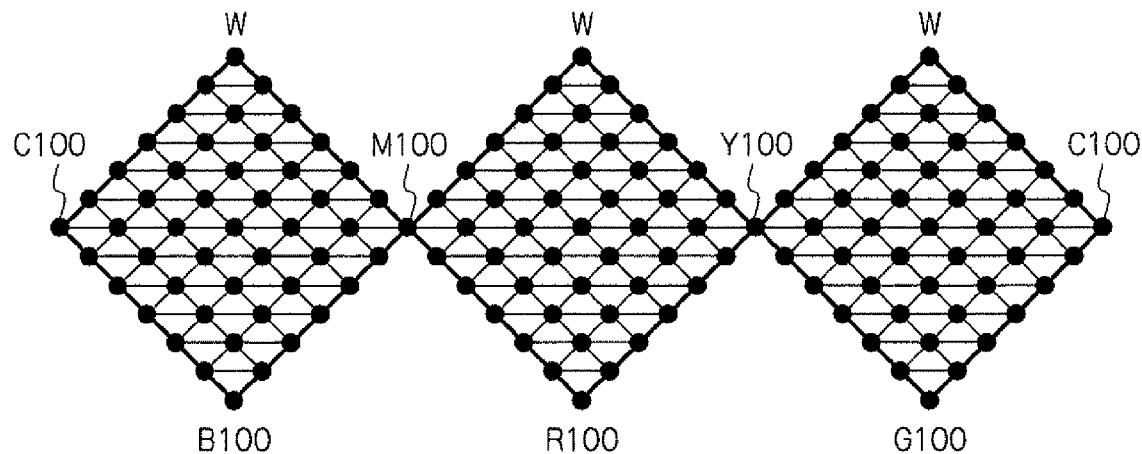
FIG. 19A and FIG. 19B are drawings illustrating an example of an upper half outline when the color material total amount limit is 250% in the second exemplary embodiment.
Figures 20A, 20B:
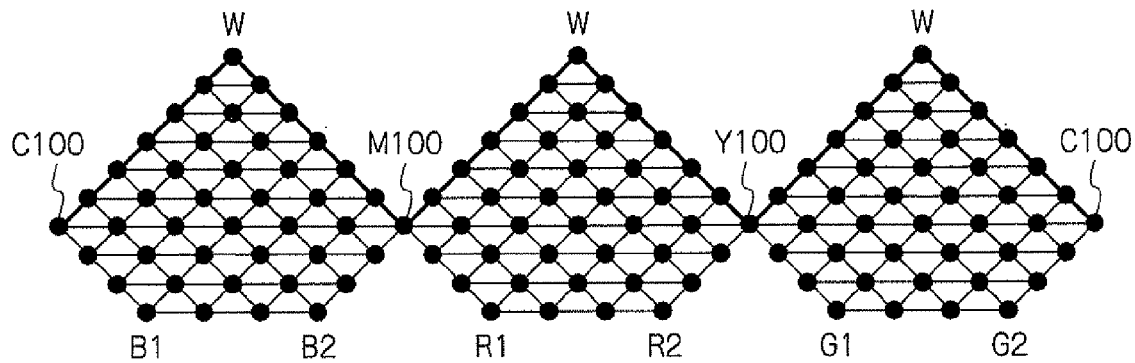
FIG. 20A and FIG. 20B are drawings illustrating an example of an upper half outline when the color material total amount limit is 150% in the second exemplary embodiment.

The upper half outline constructing section 21 of the device outline constructing section 4 constructs an upper half outline in the CMYK color space that is a device color space that includes black. FIG. 19A and FIG. 19B are diagrams illustrating an example of the upper half outline when the upper half color material total amount limit is 250% in the second exemplary embodiment. FIG. 20A and FIG. 20B are diagrams illustrating an example of the upper half outline when the upper half color material total amount limit is 150% in the second exemplary embodiment. FIG. 19A and FIG. 20A are developments of the upper half outlines, and FIG. 9B and FIG. 20B are tables of correspondence of the device color signals and the respective vertices shown in the developments. Further, the black circles in the drawings are the outline points structuring the upper half outline. By structuring triangles (the solid lines of FIG. 19A and FIG. 20A) by connecting outline points, that are arranged regularly, with adjacent outline points, a polygon group expressing the upper half outline is created.

In a CMYK printer, the upper half outline, that does not take into consideration the upper half color material total amount limit in the CMYK color space, is structured by the three surfaces shown in FIG. 13A. When the upper half color material total amount limit is 250%, the outline points on these surfaces all satisfy the upper half color material total amount limit, and therefore, are outline points structuring the upper half outline (FIG. 19A and FIG. 19B).

When the upper half color material total amount limit is 150%, at each of the three surfaces that are contiguous to the origin and the respective axes, the upper half color material total amount limit is not satisfied at some of the outline points. For example, outline points of M=K=0%, C=Y=100% are C+M+Y+K=200% which exceeds the 150% that is the upper half color material total amount limit. If M=K=0%, the outline points within the surface that satisfies C+Y≦150% structure the upper half outline. To explain with reference to the development shown in FIG. 20, a portion of the upper half outline is constructed by outline points that are on or above a horizontal line that connects the outline points G1 and G2 of C+Y=150%. Note that the same holds for cases in which C=K=0%, Y=K=0%.

Figures 21A, 21B:
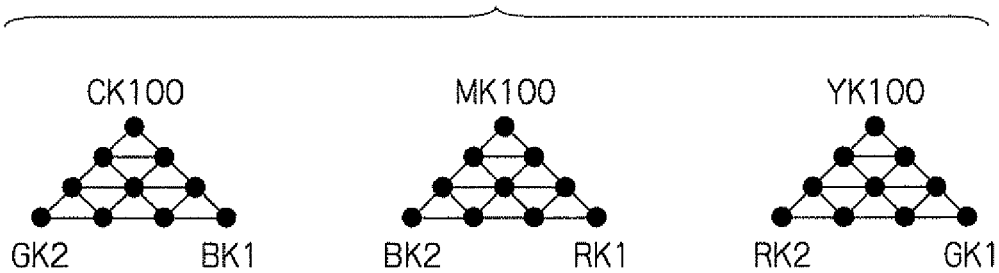
FIG. 21A and FIG. 21B are drawings illustrating an example of a lower half outline when the color material total amount limit is 250% in the second exemplary embodiment.

The lower half outline constructing section 22 constructs a lower half outline in the CMYK color space. FIG. 21A and FIG. 21B are diagrams illustrating an example of the lower half outline when the lower half color material total amount limit is 250% in the second exemplary embodiment. FIG. 21A is a development of the lower half outline. FIG. 21B is a table of correspondence of the device color signals and the respective vertices shown in the development. The black circles in the drawings are the outline points structuring the lower half outline. By structuring triangles (the solid lines of FIG. 21A) by connecting outline points, that are arranged regularly, with adjacent outline points, a polygon group expressing the lower half outline is created.

In a CMYK printer, a lower half outline, that does not take into consideration the lower half color material total amount limit in the CMYK color space, is structured by the three surfaces that are not hatched in FIG. 13B. When the lower half color material total amount limit is 250%, surfaces that are missing portions of these surfaces are the lower half outline as shown in FIG. 21A. For example, if C=K=100%, outline points within the surface that satisfies Y+M≦50% (250−200) structure the lower half outline. To explain with reference to the development shown in FIG. 21A, a portion of the lower half outline is constructed from outline points that are on or above the horizontal line that connects outline points GK2 and BK1 of Y+M=50%. Note that the same holds for cases in which M=K=100%, Y=K=100%.

When the upper half color material total amount limit is 150%, all of the outline points that structure the lower half outline are deleted, and therefore, a lower half outline does not exist. Namely, because the lower half outline is structured from outline points at which K and another one color are 100%, the color material total amount is larger than or equal to 200%. Accordingly, when the upper half color material total amount limit is 150%, none of the outline points that structure the lower half outline satisfy this upper half color material total amount limit, and therefore, a lower half outline does not exist.

Figures 22A, 22B:
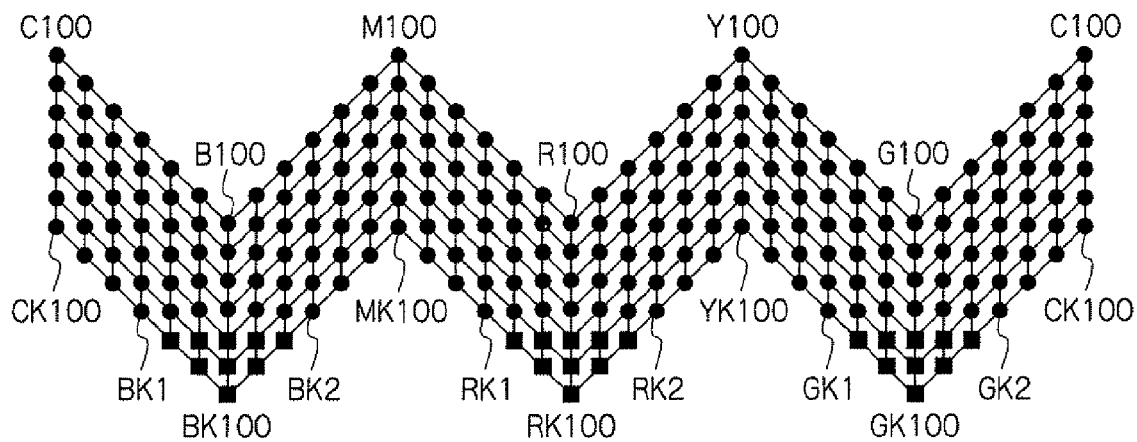
FIG. 22A and FIG. 22B are drawings illustrating an example of an intermediate outline when the color material total amount limit is 250% in the second exemplary embodiment.

The intermediate outline constructing section 23 constructs an intermediate outline in the CMYK color space. FIG. 22A and FIG. 22B are diagrams illustrating an example of the intermediate outline when the intermediate color material total amount limit is 250% in the second exemplary embodiment. FIG. 22A is a development of the intermediate outline, and FIG. 22B is a table of correspondence of the device color signals and the respective vertices shown in the development. The black circles in the drawings are the outline points that, as is, structure the intermediate outline, and the black squares are outline points that are to be corrected and made to be the intermediate outline. By structuring triangles (the solid lines of FIG. 22A) by connecting outline points, that are arranged regularly, with adjacent outline points, a polygon group expressing the intermediate outline is created.

Because the outline points shown by the black squares exceed an intermediate color material total amount limit of 250%, the CMYK device color signals corresponding to these outline points must be corrected to be equal to an intermediate color material total amount limit of 250%. As the method of correction, the color material amount of black (K) is fixed and the other color materials are reduced by equal amounts each, thereby correcting the outline points to device color signals equal to the color material total amount limit.

For example, given that the fixed color material amount is K, and that the color gamut outline points of the device color space are (C, M, 0, K), and that the color gamut outline points of a device that impose an intermediate color material total amount limit L are (C', M', Y', K), C', M', Y' may be obtained by $$C'=C-(C+M+Y+K-L)/2$$

$$M'=M-(C+M+Y+K-L)/2$$

$$Y'=0,$$

where, C≠0, M≠0

Further, given that the fixed color material amount is K, and that the color gamut outline points of the device are (C, 0, 0, K), and that the color gamut outline points of the device color space that impose the intermediate color material total amount limit L are (C', M', Y', K), C', M', Y' may be obtained by $$C'=L-K$$

$$M'=0$$

$$Y'=0,$$

where, C≠0.

As an example of computation, when, among the outline points shown in FIG. 22A, device color signal BK100= (100%, 100%, 0%, 100%) that is one outline point exceeding the intermediate color material total amount limit is corrected, BK100'=(75%, 75%, 0%, 100%).

Further, as described in JP-A No. 2005-63093, which is incorporated herein by reference, the color material amount of one color may be fixed, and the structural ratio of the other color material amounts may be made kept constant while matching the color material total amount limit. However, in this case, it should be noted that it is not easy to be determined the corresponding outline points at the time of joining with the restricting outline.

Figures 23A, 23B:
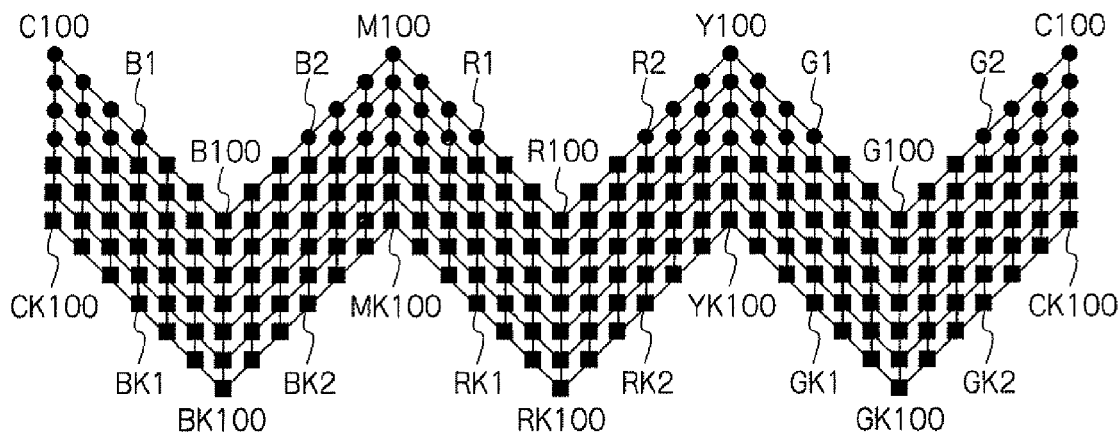
FIG. 23A and FIG. 23B are drawings illustrating an example of an intermediate outline before correction when the color material total amount limit is 150% in the second exemplary embodiment.
Figures 24A, 24B:
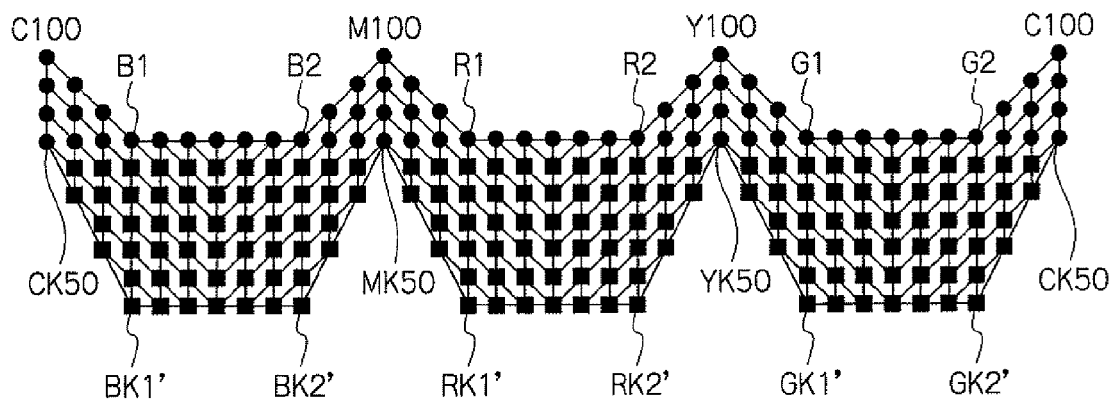
FIG. 24A and FIG. 24B are drawings illustrating an example of an intermediate outline after correction when the color material total amount limit is 150% in the second exemplary embodiment.

FIG. 23A and FIG. 23B are drawings illustrating an example of an intermediate outline before correction when the intermediate color material total amount limit is 150% in the second exemplary embodiment, and FIG. 24A and FIG. 24B are drawings illustrating an example of the intermediate outline after correction. FIG. 23A and FIG. 24A are developments of the intermediate outlines, and FIG. 23B and FIG. 24B are tables of correspondence of the device color signals and the respective vertices shown in the developments. The black circles and the black squares in the drawings are the same as in FIG. 22A. In this case as well, by structuring triangles (the solid lines of FIG. 23A and FIG. 24A) by connecting outline points, that are arranged regularly, with adjacent outline points, a polygon group expressing the intermediate outline is created.

The outline points shown by the black squares exceed an intermediate color material total amount limit of 150%, and the CMYK device color signals corresponding to these outline points must be corrected to be equal to an intermediate color material total amount limit of 150%. The method of correction, as described above, fixes the black (K) and reduces the other color materials by equal amounts, thereby correcting the outline points to the set intermediate color material total amount limit. As an example of computation, when the device color signal BK1=(100%, 50%, 0%, 100%), that is one outline point that exceeds the intermediate color material total amount limit among the outline points shown in FIG. 23A, is corrected, it becomes BK1'=(50%, 0%, 0%, 100%).

When the intermediate color material total amount limit is less than 200%, there are cases in which some of the elements of the device color signals corresponding to the outline points on the intermediate outline become negative value due to the correction. At this time, that the outline points may be corrected to be equal to the intermediate color material total amount limit, by changing the element that has become negative value to 0 and correcting the positive element (there is only one) other than K that is fixed. For example, when computing CMYK=(100%, 20%, 0%, 100%) in accordance with the above-described formulas under the condition that the intermediate color material total amount limit is 150%, C'M'Y'K=(65%, −15%, 0%, 100%). Because the element M' is negative, when carrying out further correction as described above, C"M"Y"K=(50%, 0%, 0%, 100%). In such a case, device color signals, that are the same as outline points that structure the intermediate outline, appear after correction. Therefore, redundant outline points must be deleted at the time of creating the polygon by adjacent outline points.

In this way, when the intermediate color material total amount limit is 150%, by carrying out correction on the outline points that exceed the intermediate color material total amount limit and deleting the outline points that do not structure a valid polygon, an intermediate outline such as shown in the development of FIG. 24A can be obtained. Note that regardless of being shown above or below, the outline points that are shown by the black squares in FIG. 24A are all outline points that are equal to the intermediate color material total amount limit.

Figures 25A, 25B:
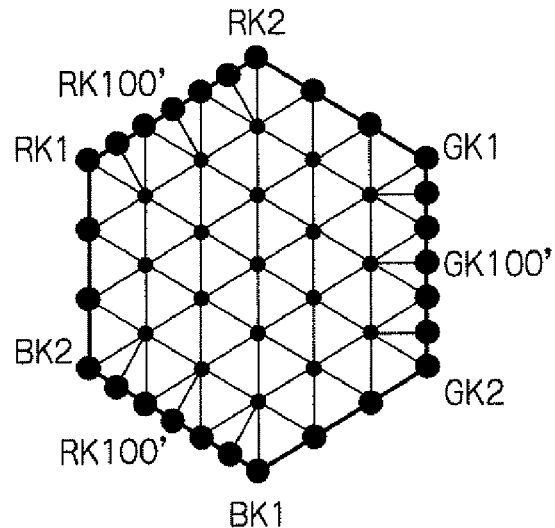
FIG. 25A and FIG. 25B are drawings illustrating an example of a restricting outline when the color material total amount limit is 250% in the second exemplary embodiment.
Figures 26A, 26B:
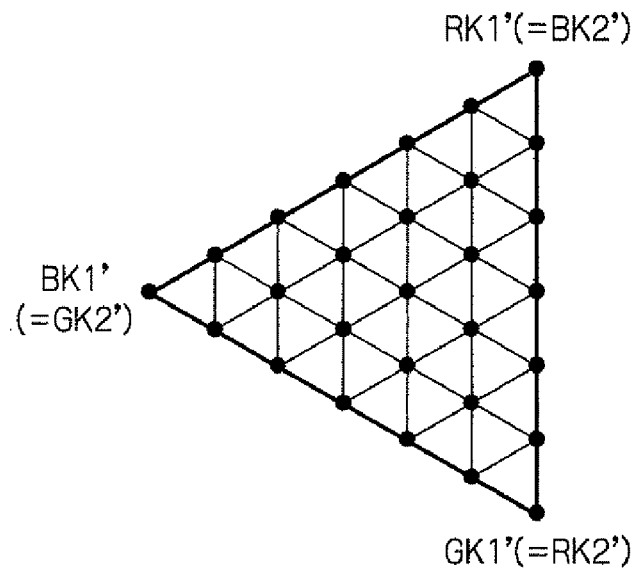
FIG. 26A and FIG. 26B are drawings illustrating an example of a restricting outline when the color material total amount limit is 150% in the second exemplary embodiment.

The restricting outline constructing section 24 constructs a restricting outline in the CMYK color space. FIG. 25A and FIG. 25B are diagrams illustrating an example of the restricting outline when the upper half color material total amount limit is 250% in the second exemplary embodiment. FIG. 26A and FIG. 26B are diagrams illustrating an example of the restricting outline when the upper half color material total amount limit is 150% in the second exemplary embodiment. FIG. 25A and FIG. 26A are developments of the restricting outlines, and FIG. 25B and FIG. 26B are tables of correspondence of the device color signals and the respective vertices shown in the developments. The black circles in the drawings are the outline points structuring the restricting outline. By structuring triangles (the solid lines of FIG. 25A and FIG. 26A) by connecting outline points, that are arranged regularly, with adjacent outline points, a polygon group expressing the restricting outline is created.

The restricting outline is, for example, a surface equal to the upper half color material total amount limit (intermediate color material total amount limit) set at the parameter setting section 5, and, in this case, is the surface in which K=100%, C+M+Y=upper half color material total amount limit (intermediate color material total amount limit)−K in the CMYK color space. Concretely, when the upper half color material total amount limit (intermediate color material total amount limit) is 250%, the restricting outline is as shown in FIG. 25A and FIG. 25B, and is an outline surface in which portions of the outer periphery are connected to the lower portion of the lower half outline shown in FIG. 21A and the other portions of the outer periphery are connected to the intermediate outline shown in FIG. 22A. At this time, at the portion of the intermediate outline shown in FIG. 22A which portion is connected with the restricting outline, the outline points that exceed the intermediate color material total amount limit are corrected to be equal to the intermediate color material total amount limit as described above. Therefore, the number of outline points that are connected increases, and, in the restricting outline, three outline points are added onto each of three sides of the hexagon so as to correspond respectively to the outline points of the intermediate outline.

Similarly, when the upper half color material total amount limit (intermediate color material total amount limit) is 150%, the restricting outline is as shown in FIG. 26A and FIG. 26B. For example, the restricting outline shown in FIG. 26A is connected to the lower portion of the intermediate outline after correction that is shown in FIG. 24A.

The outline points on the color gamut outline, that is structured by the upper half outline, the lower half outline, the intermediate outline and the restricting outline that are determined in this way, are converted into color signals of an arbitrary color space at the color space converter 2. For example, the outline points are converted into the CIELAB color space that is a device-independent color space. In this way, the color gamut outline of a CMYK printer can be determined in an arbitrary color space.

Note that, in order to simplify explanation, the above first and second exemplary embodiments describe a color outputting device of the CMY color space and a color outputting device of the CMYK color space. However, the exemplary embodiments may be applied also to outputting devices of four or more dimensions not including black, or outputting devices of five or more dimensions including black.

Figure 27:
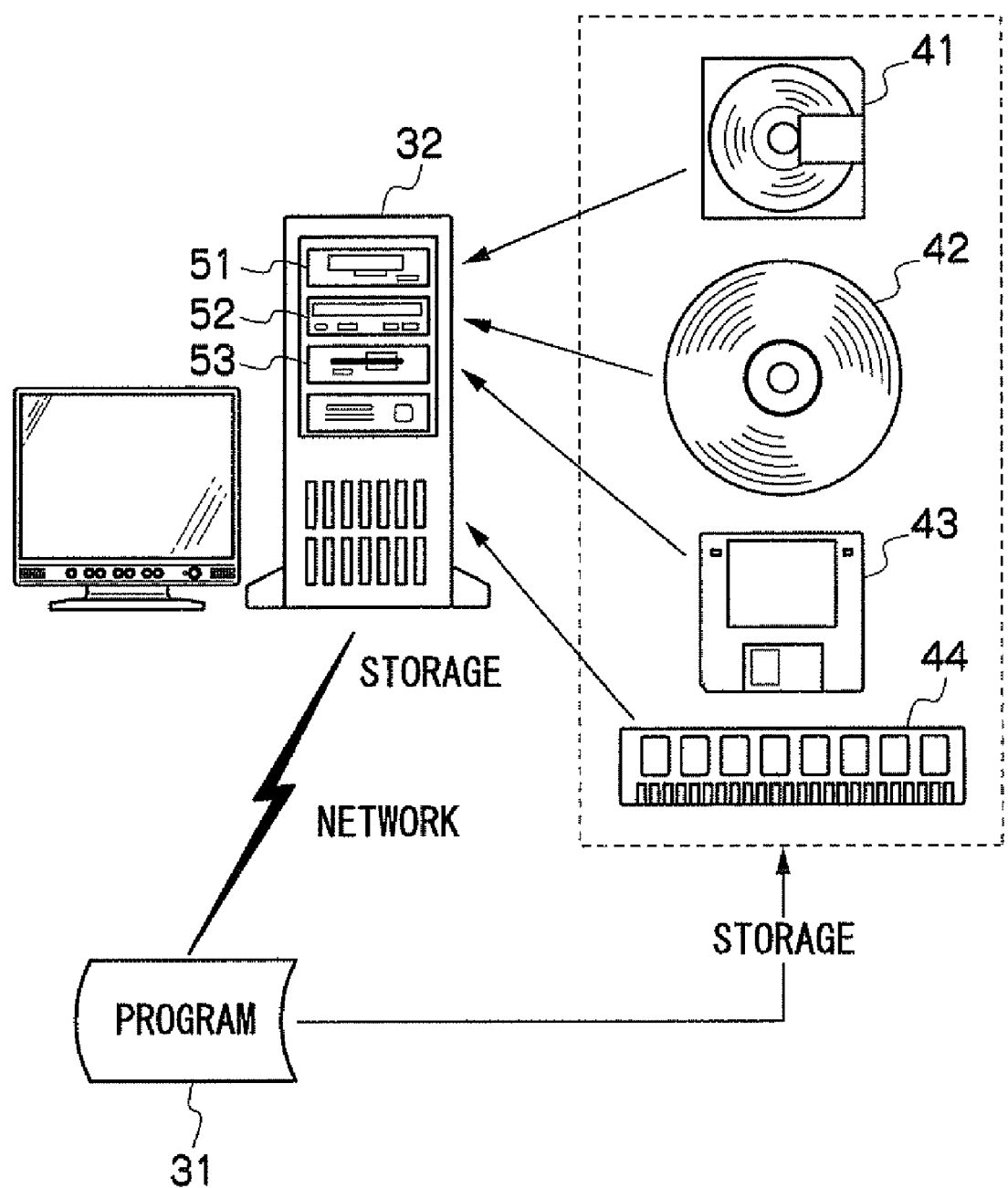
FIG. 27 is a drawing illustrating an example of a computer program realizing the functions of a color gamut outline computing device or a color gamut outline computing method, and a storage medium that stores the computer program.

FIG. 27 is a drawing illustrating examples of a computer program for realizing the functions of the color gamut outline computing device or the color gamut outline computing method, and storage media that store the computer program. FIG. 27 shows a program 31, a computer 32, a magneto-optical disk 41, an optical disk 42, a magnetic disk 43, a memory 44, a magneto-optical disk device 51, an optical disk device 52 and a magnetic disk device 53.

Some or all of the structures described in the first and second exemplary embodiments can be realized by the program 31 that can be executed by a computer. In a case of realizing the embodiments by the program 31, the program 31 and data and the like that the program uses are stored on a computer-readable storage medium. In accordance with the description contents of the program, the storage medium brings about a changed state of energy such as magnetism, light, electricity or the like with respect to a reading device that is provided at the hardware resources of the computer, and transfers the description contents of the program to the reading device in a format of signals corresponding thereto. Examples of the storage medium include, but are not limited to, the magneto-optical disk 41, the optical disk 42 (including compact disks (CDs), digital versatile disks (DVDs) and the like), the magnetic disk 43, the memory 44 (including IC cards, memory cards and the like). Further, the storage medium is not limited to a portable storage medium.

The program 31 may be stored on the storage medium. For example, by loading the storage medium into the magneto-optical disk device 51, the optical disk device 52, the magnetic disk device 53 or an unillustrated memory slot of the computer 32, the program 31 may be read-out from the computer, and the functions of the color gamut outline computing device or the color gamut outline computing method can be implemented. Alternately, a storage medium may be provided or incorporated into the computer 32 in advance, and the program 31 may be transferred to the computer 32 via, for example, a network or the like, to store the program 31 in the storage medium and be executed. Some of the functions may be structured by hardware, or all may be structured by hardware.

What is claimed is:

1. A color gamut outline computing device comprising:
 a setting section that sets a single-color amount limit of at least one color material of device color signals of a device color space of four or more dimensions including black, an upper half color material total amount limit in an upper half region of the device color space, and a lower half color material total amount limit in a lower half region of the device color space;
 an upper half outline constructing section that constructs an upper half outline, the upper half outline being formed from outline points, that are points on a color gamut outline at which black is 0% and one or more color components other than black is 0% in the device color space, and that satisfy the single-color amount limit and the upper half color material total amount limit;

an intermediate outline constructing section that constructs an intermediate outline by:
(A) determining an intermediate color material total amount limit in an intermediate region that is between the upper half region and the lower half region, on the basis of the upper half color material total amount limit and the lower half color material total amount limit, and
(B) deleting or correcting outline points, that are on a color gamut outline at which one or more color components other than black satisfy the single-color amount limit and one or more color components other than black is 0% in the device color space and that do not satisfy the intermediate color material total amount limit, to satisfy the intermediate color material total amount limit;

a lower half outline constructing section that constructs a lower half outline, the lower half outline being formed from outline points, that are points on a color gamut outline at which the black component satisfies the single-color amount limit and one or more color components other than black satisfy the single-color amount limit in the device color space, and that satisfy the lower half color material total amount limit;

a restricting outline constructing section that constructs a restricting outline formed from outline points that satisfy the single-color amount limits, and satisfy at least one of the upper half color material total amount limit, the intermediate color material total amount limit and the lower half color material total amount limit, the outline points of the restricting outline being connected to outline points of at least one of the upper half outline, the intermediate outline and the lower half outline which satisfy at least one of the upper half color material total amount limit, the intermediate color material total amount limit and the lower half color material total amount limit; and a color space converter that converts outline points of the upper half outline, the intermediate outline, the lower half outline and the restricting outline into outline points of a color space other than the device color space.

2. The color gamut outline computing device of claim 1, wherein, if an outline point, that is adjacent to an outline point that exceeds the upper half color material total amount limit, is less than the upper half color material total amount limit, the upper half outline constructing section corrects the outline point that exceeds the upper half color material total amount limit to be equal to the upper half color material total amount limit.

3. The color gamut outline computing device of claim 1, wherein, if an outline point, that is adjacent to an outline point that exceeds the lower half color material total amount limit, is less than the lower half color material total amount limit, the lower half outline constructing section corrects the outline point that exceeds the lower half color material total amount limit to be equal to the lower half color material total amount limit.

4. The color gamut outline computing device of claim 1, wherein, if an outline point, that is adjacent to an outline point that exceeds the single-color amount limit, is less than the single-color amount limit, the upper half outline constructing section and the lower half outline constructing section correct the outline point that exceeds the single-color amount limit to be equal to the single-color amount limit.

5. The color gamut outline computing device of claim 1, wherein the upper half color material total amount limit is larger than the lower half color material total amount limit.

6. The color gamut outline computing device of claim 1, wherein the intermediate outline constructing section varies a shape of the intermediate outline in accordance with a shape of the upper half outline determined by the upper half outline constructing section.

7. The color gamut outline computing device of claim 1, wherein the intermediate outline constructing section varies a shape of the intermediate outline in accordance with the intermediate color material total amount limit.

8. The color gamut outline computing device of claim 1, wherein the intermediate color material total amount limit is set in accordance with the black color component.

9. The color gamut outline computing device of claim 1, wherein the setting section can set the single-color amount limit for each device color signal from 0% to 100%.

10. A color gamut outline computing device comprising:
a setting section that sets a single-color amount limit of at least one color material of device color signals of a device color space of three or more dimensions not including black, and a color material total amount limit of respective device colors;

an upper half outline constructing section that constructs an upper half outline, the upper half outline being formed from outline points that are points on a color gamut outline at which one or more color components in the device color space are 0% and that satisfy the single-color amount limit and the color material total amount limit;

a lower half outline constructing section that constructs a lower half outline, the lower half outline being formed from outline points that are points on a color gamut outline at which one or more color components in the device color space satisfy the single-color amount limit and that satisfy the color material total amount limit;

a restricting outline constructing section that determines a restricting outline formed from outline points that satisfy the single-color amount limit and the color material total amount limit, the outline points of the restricting outline being connected to outline points of the upper half outline or the lower half outline which satisfy the single-color amount limit and the color material total amount limit; and a color space converter that converts outline points of the upper half outline, the lower half outline and the restricting outline into outline points of a color space other than the device color space.

11. The color gamut outline computing device of claim 10, wherein, if an outline point, that is adjacent to an outline point that exceeds the color material total amount limit, is less than the color material total amount limit, the upper half outline constructing section and the lower half outline constructing section correct the outline point that exceeds the color material total amount limit to be equal to the color material total amount limit.

12. The color gamut outline computing device of claim 10, wherein, if an outline point, that is adjacent to an outline point that exceeds the single-color amount limit, is less than the single-color amount limit, the upper half outline constructing section and the lower half outline constructing section correct the outline point that exceeds the single-color amount limit to be equal to the single-color amount limit.

13. The color gamut outline computing device of claim 10, wherein the setting section can set the single-color amount limit for each device color signal from 0% to 100%.

14. A color gamut outline computing method comprising:
- setting a single-color amount limit of at least one color material of device color signals of a device color space of four or more dimensions including black, an upper half color material total amount limit in an upper half region of the device color space, and a lower half color material total amount limit in a lower half region of the device color space;
- determining an intermediate color material total amount limit of a color material total amount in an intermediate region between the upper half region and the lower half region, on the basis of the upper half color material total amount limit and the lower half color material total amount limit;
- constructing an upper half outline that is formed from outline points that are on a color gamut outline at which black is 0% and one or more color components other than black are 0% in the device color space, and that satisfy the single-color amount limit and the upper half color material total amount limit;
- constructing an intermediate outline by deleting or correcting outline points, that are on a color gamut outline at which one or more color components other than black satisfy the single-color amount limit and one or more color components other than black is 0% in the device color space and that do not satisfy the intermediate color material total amount limit, to satisfy the intermediate color material total amount limit;
- constructing a lower half outline that is formed from outline points, that are on a color gamut outline at which the black color component satisfies the single-color amount limit and one or more color components other than black satisfy the single-color amount limit in the device color space, and that satisfy the lower half color material total amount limit;
- constructing a restricting outline formed from outline points that satisfy the single-color amount limits, and satisfy at least one of the upper half color material total amount limit, the intermediate color material total amount limit and the lower half color material total amount limit, the outline points of the restricting outline being connected to outline points of at least one of the upper half outline, the intermediate outline and the lower half outline which satisfy at least one of the upper half color material total amount limit, the intermediate color material total amount limit and the lower half color material total amount limit; and
- converting outline points of the upper half outline, the intermediate outline, the lower half outline and the restricting outline into outline points of a color space other than the device color space.

15. A color gamut outline computing method comprising:
- setting a single-color amount limit of at least one color material of device color signals of a device color space of three or more dimensions not including black, and a color material total amount limit of respective device colors;
- constructing an upper half outline that is formed from outline points, that are points on a color gamut outline at which one or more color components in the device color space are 0%, and that satisfy the single-color amount limit and the color material total amount limit;
- constructing a lower half outline that is formed from outline points, that are points on a color gamut outline at which one or more color components in the device color space satisfy the single-color amount limit, and that satisfy the color material total amount limit;
- constructing a restricting outline that is formed from outline points that satisfy the single-color amount limit and the color material total amount limit, the outline points of the restricting outline being connected to outline points of the upper half outline or the lower half outline which satisfy the color material total amount limit; and
- converting outline points of the upper half outline, the lower half outline and the restricting outline into outline points of a color space other than the device color space.

16. A non-transitory computer readable storage medium storing a program causing a computer to execute color gamut outline computing processing, the processing comprising:
- setting a single-color amount limit of at least one color material of device color signals of a device color space of four or more dimensions including black, an upper half color material total amount limit in an upper half region of the device color space, and a lower half color material total amount limit in a lower half region of the device color space;
- determining an intermediate color material total amount limit of a color material total amount in an intermediate region between the upper half region and the lower half region, on the basis of the upper half color material total amount limit and the lower half color material total amount limit;
- constructing an upper half outline that is formed from outline points that are on a color gamut outline at which black is 0% and one or more color components other than black are 0% in the device color space, and that satisfy the single-color amount limit and the upper half color material total amount limit;
- constructing an intermediate outline by deleting or correcting outline points, that are on a color gamut outline at which one or more color components other than black satisfy the single-color amount limit and one or more color components other than black is 0% in the device color space and that do not satisfy the intermediate color material total amount limit, to satisfy the intermediate color material total amount limit;
- constructing a lower half outline that is formed from outline points, that are on a color gamut outline at which the black color component satisfies the single-color amount limit and one or more color components other than black satisfy the single-color amount limit in the device color space, and that satisfy the lower half color material total amount limit;
- constructing a restricting outline formed from outline points that satisfy the single-color amount limits, and satisfy at least one of the upper half color material total amount limit, the intermediate color material total amount limit and the lower half color material total amount limit, the outline points of the restricting outline being connected to outline points of at least one of the upper half outline, the intermediate outline and the lower half outline which satisfy at least one of the upper half color material total amount limit, the intermediate color material total amount limit and the lower half color material total amount limit; and
- converting outline points of the upper half outline, the intermediate outline, the lower half outline and the restricting outline into outline points of a color space other than the device color space.

17. The storage medium of claim 16, wherein the processing further comprising, if an outline point, that is adjacent to an outline point that exceeds the color material total amount limit, is less than the color material total amount limit, correcting the outline point that exceeds the color material total amount limit to be equal to the color material total amount limit.

18. A non-transitory computer readable storage medium storing a program causing a computer to execute color gamut outline computing processing, the processing comprising:

setting a single-color amount limit of at least one color material of device color signals of a device color space of three or more dimensions not including black, and a color material total amount limit of respective device colors;

constructing an upper half outline that is formed from outline points, that are points on a color gamut outline at which one or more color components in the device color space are 0%, and that satisfy the single-color amount limit and the color material total amount limit;

constructing a lower half outline that is formed from outline points, that are points on a color gamut outline at which one or more color components in the device color space satisfy the single-color amount limit, and that satisfy the color material total amount limit;

constructing a restricting outline that is formed from outline points that satisfy the single-color amount limit and the color material total amount limit, the outline points of the restricting outline being connected to outline points of the upper half outline or the lower half outline which satisfy the color material total amount limit; and converting outline points of the upper half outline, the lower half outline and the restricting outline into outline points of a color space other than the device color space.

\* \* \* \* \*